United States Patent
Kohara et al.

(10) Patent No.: US 9,133,886 B2
(45) Date of Patent: Sep. 15, 2015

(54) CONSTANT VELOCITY UNIVERSAL JOINT

(75) Inventors: Mika Kohara, Iwata (JP); Tatsuro Sugiyama, Iwata (JP); Natsuhiko Mori, Kuwana (JP); Hiroyuki Noda, Kuwana (JP); Takahiro Okuno, Kuwana (JP); Hajime Asada, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/005,367

(22) PCT Filed: Feb. 28, 2012

(86) PCT No.: PCT/JP2012/054880
§ 371 (c)(1),
(2), (4) Date: Oct. 23, 2013

(87) PCT Pub. No.: WO2012/127995
PCT Pub. Date: Sep. 27, 2012

(65) Prior Publication Data
US 2014/0038732 A1 Feb. 6, 2014

(30) Foreign Application Priority Data

Mar. 18, 2011 (JP) ................. 2011-060767
Dec. 16, 2011 (JP) ................. 2011-275724

(51) Int. Cl.
*F16C 1/24* (2006.01)
*F16D 3/223* (2011.01)
(Continued)

(52) U.S. Cl.
CPC ............... *F16D 3/223* (2013.01); *B22F 3/168* (2013.01); *B22F 5/106* (2013.01);
(Continued)

(58) Field of Classification Search
CPC ... C22C 33/0257; C22C 338/00; F16D 3/223; F16D 2200/0008; F16D 2250/0046
USPC ............... 464/8, 15, 144–146, 902, 905, 906; 384/492, 907, 910; 29/898.067, 29/898.14; 75/228, 231, 950; 419/5, 28
See application file for complete search history.

(56) References Cited

U.S. PATENT DOCUMENTS 3,782,794 A * 1/1974 Chmura et al. ............... 384/492
4,967,705 A 11/1990 Maciag et al.
(Continued)

FOREIGN PATENT DOCUMENTS

CN 1922413 2/2007
JP 61-502554 11/1986
(Continued)

OTHER PUBLICATIONS

Universal Joint and Driveshaft Design Manual, AE-7, Section 3.2.8, Society of Automotive Engineers, Inc., Warrendale, PA, TJ1079.S62 1079, pp. 145-150.*
(Continued)

*Primary Examiner* — Gregory Binda
(74) *Attorney, Agent, or Firm* — Wenderoth, Lind & Ponack, L.L.P.

(57) ABSTRACT

A constant-velocity universal joint includes an outer joint member; an inner joint member arranged in an inside of the outer joint member; and torque transmitting members. At least one of the outer joint member and the inner joint member comprises track grooves that are engaged with rolling surfaces of the torque transmitting members. At least one of the components of the constant-velocity universal joint is formed of a metal sintered compact. The metal sintered compact has a relative density of 80% or more and less than 100%. The metal sintered compact comprises a hardened layer formed on a surface thereof through heat treatment. Among the components each formed of the metal sintered compact, a component having a ring shape is subjected to a cold rolling process.

20 Claims, 21 Drawing Sheets

(51) Int. Cl.
- *C22C 38/00* (2006.01)
- *F16D 3/205* (2006.01)
- *B22F 5/10* (2006.01)
- *F16D 3/20* (2006.01)
- *F16D 3/22* (2006.01)
- *B22F 3/16* (2006.01)
- *C22C 33/02* (2006.01)

(52) U.S. Cl.
CPC ............ *C22C 33/0257* (2013.01); *C22C 38/00* (2013.01); *F16D 3/20* (2013.01); *F16D 3/2055* (2013.01); *F16D 3/22* (2013.01); *B22F 2998/10* (2013.01); *F16D 2200/0008* (2013.01); *F16D 2250/0046* (2013.01); *F16D 2250/0053* (2013.01)

(56) References Cited

U.S. PATENT DOCUMENTS

| | | | |
|---|---|---|---|
| 5,881,354 A | | 3/1999 | Shivanath et al. |
| 8,366,558 B2 * | | 2/2013 | Muramatsu .................. 464/905 |
| 2004/0197219 A1 * | | 10/2004 | Degen et al. .................. 419/28 |
| 2007/0293327 A1 | | 12/2007 | Ishijima et al. |
| 2011/0000335 A1 | | 1/2011 | Chiesa et al. |
| 2011/0110617 A1 | | 5/2011 | Muramatsu |
| 2012/0180589 A1 * | | 7/2012 | Okuno et al. .................. 419/5 X |

FOREIGN PATENT DOCUMENTS

| | | |
|---|---|---|
| JP | 3-105726 | 11/1991 |
| JP | 2000-509440 | 7/2000 |
| JP | 2000-355726 | 12/2000 |
| JP | 2004-018958 | 1/2004 |
| JP | 2009-079136 | 4/2009 |
| JP | 2009-203535 | 9/2009 |
| JP | 2010-1941 | 1/2010 |
| JP | 2010-512249 | 4/2010 |
| JP | 2010-229433 | 10/2010 |
| JP | 2010-276049 | 12/2010 |

OTHER PUBLICATIONS

International Preliminary Report on Patentability and Written Opinion of the International Searching Authority issued Oct. 3, 2013 in International(PCT) Application No. PCT/JP2012/054880.

International Search Report mailed May 29, 2012 in International (PCT) Application No. PCT/JP2012/054880.

Chinese Office Action issued Apr. 24, 2015 in corresponding Chinese Patent Application No. 201280014099.X with English translation.

\* cited by examiner

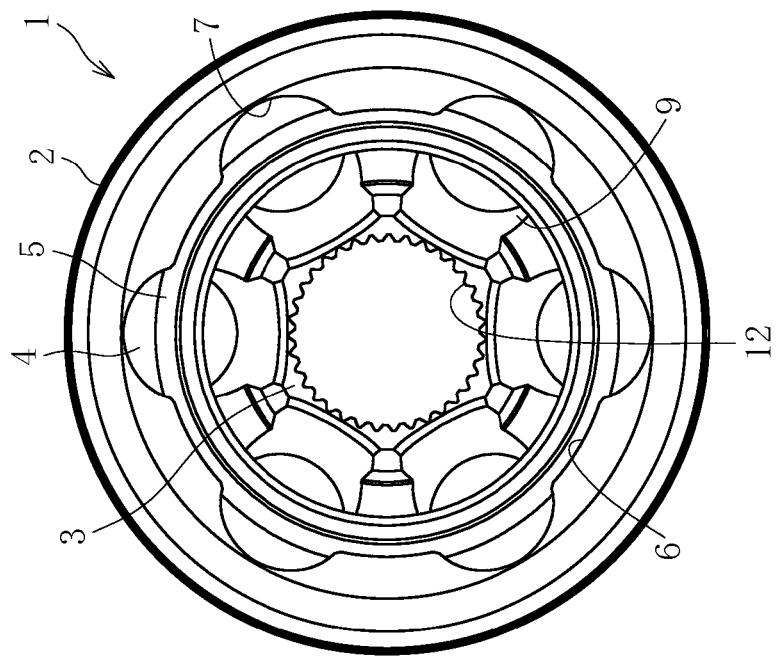
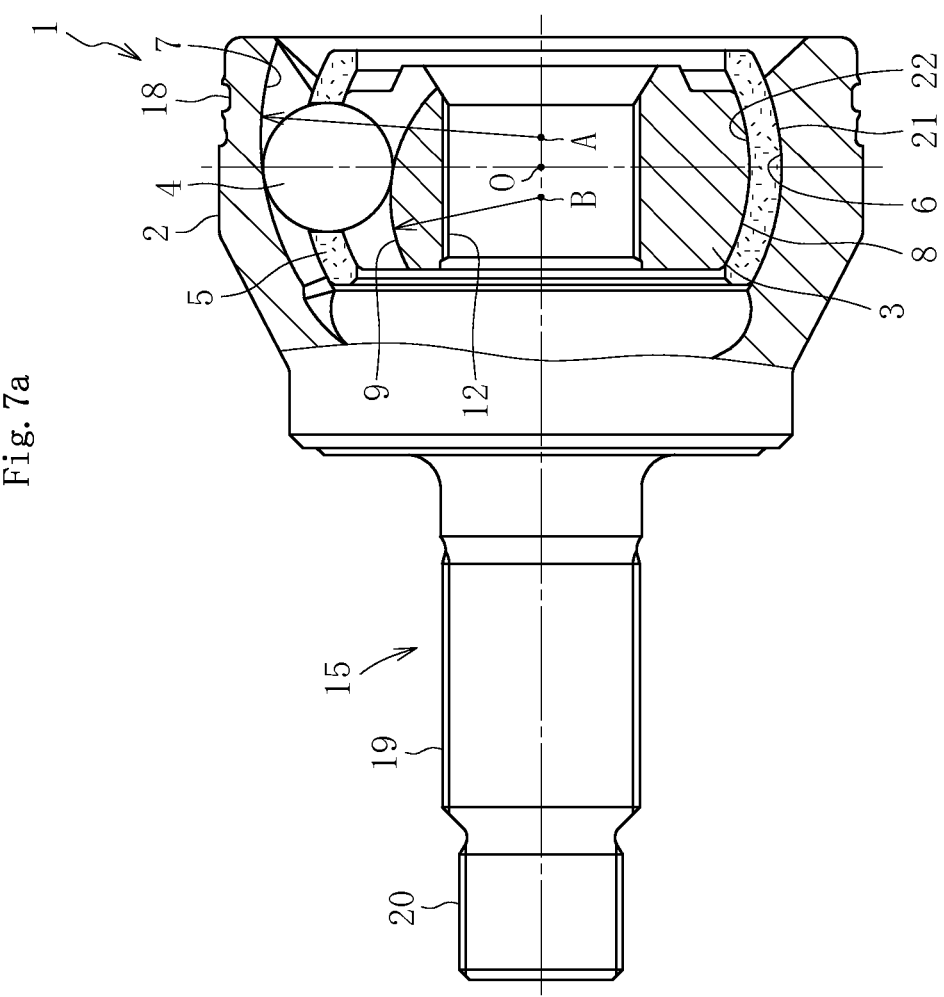

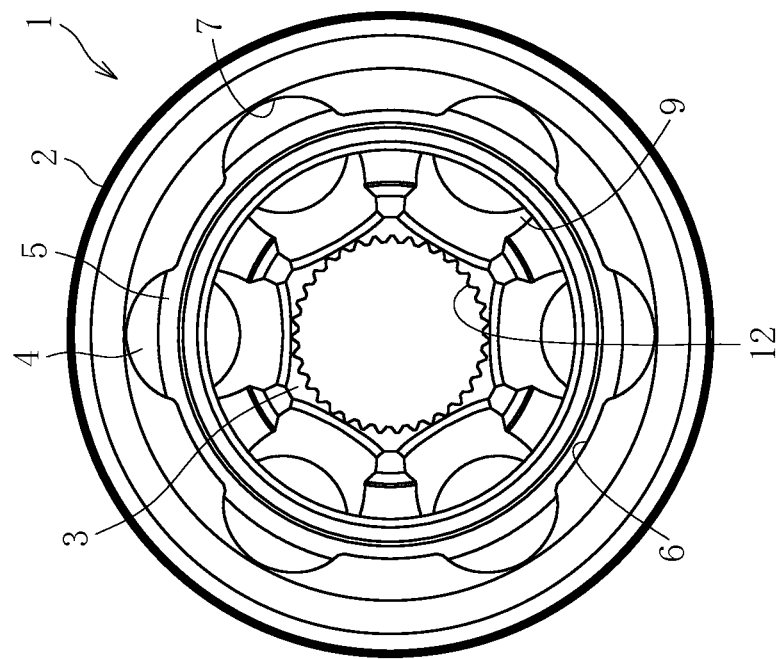
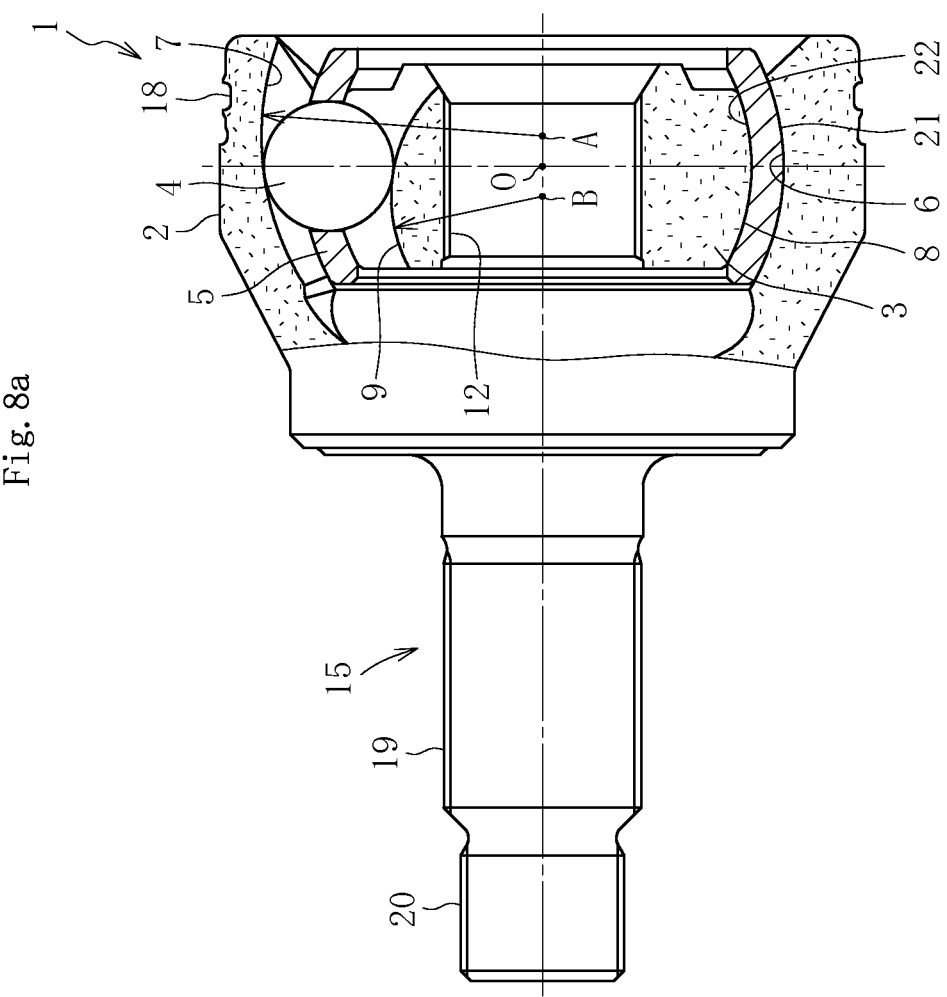
Fig. 8a
Fig. 8b

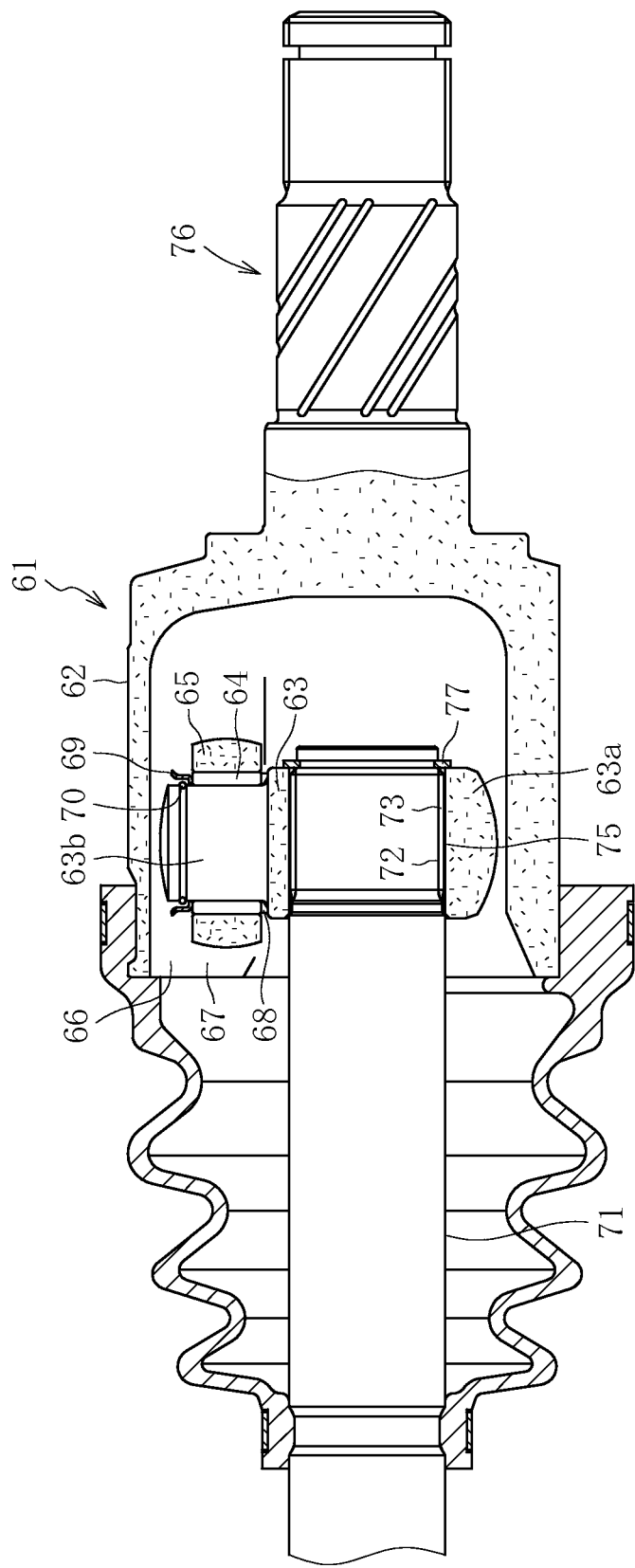

Fig. 21
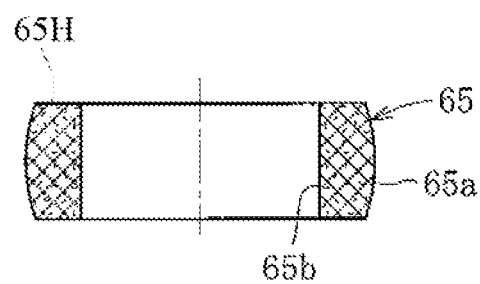
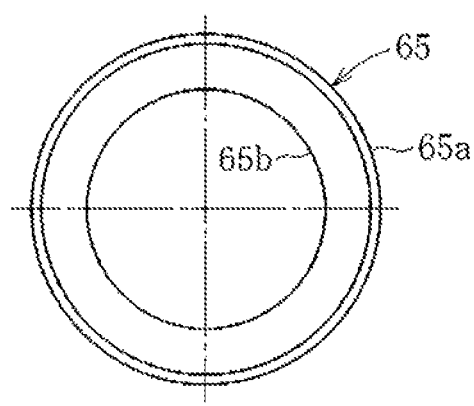

Fig. 26
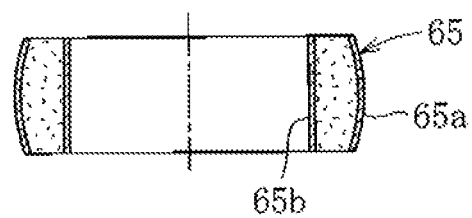
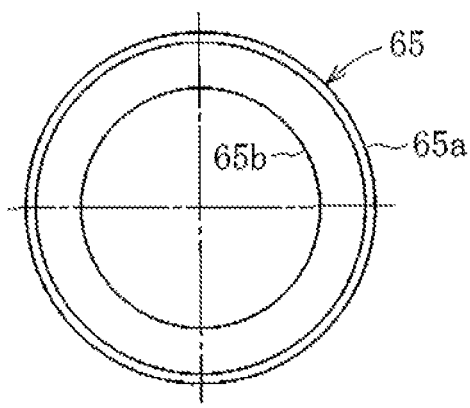

CONSTANT VELOCITY UNIVERSAL JOINT

TECHNICAL FIELD

The present invention relates to a constant velocity universal joint that is used in power transmission systems for automobiles, aircraft, ships, and various industrial machines, specifically, built into a drive shaft, a propeller shaft, and the like used, for example, in FF vehicles and 4WD vehicles, and allows angular displacement between two shafts on a driving side and a driven side.

BACKGROUND ART

As a constant velocity universal joint built into a drive shaft, a propeller shaft, and the like for transmitting a rotational force at a constant velocity from an engine of an automobile to a wheel, for example, there are two types that are a fixed type constant velocity universal joint and a plunging type constant velocity universal joint. Those constant velocity universal joints each have a structure capable of coupling the two shafts on the driving side and the driven side to each other, and transmitting rotational torque at a constant velocity even when each of the two shafts forms an operating angle.

The drive shaft for transmitting power from the engine of the automobile to a driving wheel needs to adapt to angular displacement and axial displacement due to changes in relative positional relationship between a differential and the wheels, and hence the drive shaft generally has a structure in which the plunging type constant velocity universal joint is mounted to the differential side (inboard side), the fixed type constant velocity universal joint is mounted to the driving wheel side (outboard side), and both the constant velocity universal joints are coupled to each other with the shaft. Typical examples of the fixed type constant velocity universal joint include a Rzeppa type constant velocity universal joint, and typical examples of the plunging type constant velocity universal joint include a double offset type constant velocity universal joint and a tripod type constant velocity universal joint.

The above-mentioned constant velocity universal joints need to be excellent in strength and durability, and hence solid metal materials (ingot materials) are generally used for components of those constant velocity universal joints. Thus, the components are finished into complete products by, for example, the steps of performing a forging process and the like so as to obtain a preform, performing a turning process on an outer surface, an inner surface, and the like, performing heat treatment such as quenching, and performing a grinding process on parts required to have high accuracy. In this way, the amounts of processing and material loss are large, and hence reduction in manufacturing cost is limited.

Meanwhile, the constant velocity universal joint described in Patent Document 1 includes a cage made of a sintered metal. However, measures to secure a requisite strength and a requisite durability of the constant-velocity universal joint, and measures in view of manufacture, such as that for mass-production of the constant velocity universal joint, need to be further studied.

Further, in view of use environment, for an automobile left in an extremely cold region over a long time period, a temperature of a fixed type constant velocity universal joint used to drive a front wheel thereof is as low as an outside temperature (for example, −20° C. or less), and a temperature of grease sealed therein is low as well. In such a case, when torque is input to the joint at a high operating angle, immediately after the input of the torque, stick-slip due to a temporary lack of lubricity may occur at portions in an inside of the joint, such as portions between track grooves and balls, between an inner spherical surface of an outer joint member and an outer spherical surface of the cage, and between an outer spherical surface of an inner joint member and an inner spherical surface of the cage. Such stick-slip may be unpleasant noise to driver's ears (this noise is referred to as "noise at low temperature"). The noise at low temperature is immediately deadened as a result of an increase in joint internal temperature due to heat generation along with rotation of the joint. Thus, the noise at low temperature is a problem only at the time of a travel start, in other words, not a problem except immediately after the travel start. However, it has been desired to take some countermeasure therefor.

PRIOR ART DOCUMENTS

Patent Documents

Patent Document 1: Japanese Utility Model Application Laid-open (JP-U)No. 3-105726

SUMMARY OF THE INVENTION

Problems to be Solved by the Invention

In view of the problems described above, it is an object of the present invention to provide a constant velocity universal joint having requisite performance, a requisite strength, a requisite durability, and a high material yield, and capable of being mass-produced with high processability and achieving cost reduction.

In addition, Patent Document 1 does not describe a method of sintering a cage formed of a metal sintered compact, but a cold isostatic pressing method (CIP method) and a hot isostatic pressing method (HIP method) generally need to be performed in order to secure mechanical properties of the cage. It is conceived that, in those methods, a steel bar made of a sintered metal is formed, cut into a predetermined length, and then finished into a cage having a predetermined shape through a machining process. In this case, a finishing process needs to be performed, and hence there are problems in that material yields are low and cost reduction achieved by forming the cage with the metal sintered compact is less advantageous.

Further, the CIP method and the HIP method require large-scale equipment, and hence are unsuited to a series production. Therefore, none of those methods is practical as a method of manufacturing the cage that is a component requiring high mass-productivity.

In view of the problems described above, it is a further object of the present invention to provide a constant velocity universal joint having a ring-shaped component that is suited to a series production, and also having requisite performance, a requisite strength, a requisite durability, and a high material yield, and capable of being mass-produced with high processability and achieving cost reduction.

Solutions to the Problems

Through various studies for achieving the above-mentioned objects, the inventors of the present invention have conceived the following two novel ideas, that is, utilizing high-density metal sintered compacts for components of the constant velocity universal joint, and forming hardened layers on surfaces of the metal sintered compacts through heat treatment. The inventors of the present invention have combined those two ideas to arrive at the present invention. Further, the inventors of the present invention have also conceived an idea of enabling a ring-shaped component formed of the metal sintered compact to be produced in series through general powder metallurgical pressing and a general cold rolling process, and combined this idea with the above-mentioned two ideas to arrive at the present invention.

As technical means for attaining the above-mentioned objects, according to one embodiment of the present invention, there is provided a constant velocity universal joint, comprising: an outer joint member; an inner joint member arranged in an inside of the outer joint member; and torque transmitting members, in which at least one of the outer joint member and the inner joint member comprises track grooves that are engaged with rolling surfaces of the torque transmitting members, in which at least one of the components of the constant velocity universal joint is formed of a metal sintered compact, in which the metal sintered compact has a relative density of 80% or more and less than 100%, and in which the metal sintered compact comprises a hardened layer formed on a surface thereof through heat treatment.

The metal sintered compact of the at least one of the components of the constant velocity universal joint has the relative density of 80% or more and less than 100%. The relative density is herein expressed by the following mathematical expression.

relative density=(density of metal sintered compact/
true density)×100[%]

In this expression, "true density [g/cm$^3$]" refers to a theoretical density of a material that does not have internal pores, such as a preform made of an ingot material, and can be obtained from the following mathematical expressions.

Material having a single composition true density=100/(100/density of element of material)
=density of element of material Material having a plurality of compositions (three types that are compositions A to C are exemplified here)

true density=100/{(mixing ratio of element $A$/density
of element $A$)+(mixing ratio of element $B$/density
of element $B$)+(mixing ratio of element $C$/density
of element $C$)}

For example, as for a stainless steel material having a chemical composition containing Fe and Cr respectively by 87.0 [wt %] and 13.0 [wt %], those elements respectively have densities of 7.87 [g/cm$^3$] and 7.15 [g/cm$^3$], and hence a true density can be calculated as follows.

true density=100/{(87.0/7.87)±(13.0/7.15)}≈7.78

The constant velocity universal joint according to one embodiment of the present invention is formed of the metal sintered compact having the high relative density of 80% or more and less than 100%, and the hardened layer is formed on the surface thereof through the heat treatment. Thus, a requisite mechanical strength and a requisite durability life can be secured. The metal sintered compact is obtained by sintering a green compact formed in conformity with a shape of the at least one of the components of the constant velocity universal joint. Then, the hardened layer is formed on the surface thereof through the heat treatment. With this, the metal sintered compact can be provided with an even higher surface hardness. As a result, a Rockwell C-scale hardness (HRC) of 55 or more, preferably 57 or more, which is requisite to the track grooves, and a spherical surface of the metal sintered compact, can be secured. As the heat treatment, immersion quenching, carburizing-and-quenching, and various kinds of other treatment may be employed, and can be appropriately selected in accordance with materials and product specifications. In this way, components each having a predetermined accuracy and a predetermined mechanical strength can be obtained, and hence the components of the constant velocity universal joint, which have requisite functions, can be mass-produced with high processability. Thus, even complicated shapes of the components can be formed without waste of materials. In this way, cost reduction of the constant velocity universal joint can be achieved. Further, in view of performance, despite the high density, the metal sintered compact has an appropriate number of pores, and hence it is possible to achieve a contact state in which stick-slip is less liable to occur between surfaces of the track grooves and balls, and on contact portions in the fixed type constant velocity universal joint. In addition, due to a high holding capability of the grease as a lubricant, generation of the stick-slip and noise at low temperature can be suppressed. Thus, the constant velocity universal joint according to one embodiment of the present invention is suited as a constant velocity universal joint to be mounted to a drive shaft and a propeller shaft.

As the constant velocity universal joint according to one embodiment of the present invention, for example, there is provided a constant velocity universal joint, in which the outer joint member comprises the track grooves, in which the inner joint member comprises the track grooves, and in which the torque transmitting members comprise balls that are engaged between the track grooves, the balls being held by a cage. Specifically, the constant velocity universal joint comprises a fixed type constant velocity universal joint such as a Rzeppa type constant velocity universal joint and an undercut free type constant velocity universal joint, and a plunging type constant velocity universal joint such as a double offset type constant velocity universal joint and a cross-groove type constant velocity universal joint. In those constant velocity universal joints, the appropriate number of the balls is from approximately three to ten. As another example of the constant velocity universal joint according to one embodiment of the present invention, there is provided a tripod type constant velocity universal joint, in which the inner joint member comprises a tripod member, in which the tripod member comprises spherical rollers mounted thereto in a freely rotatable manner, and in which the spherical rollers are engaged with the track grooves of the outer joint member. At least one of the inner joint member, the outer joint member, the cage, the rollers, and the like that are components of the constant velocity universal joint can be formed of the metal sintered compact. Thus, the present invention is applicable to any of a case in which one of the components of the constant velocity universal joint is formed of the metal sintered compact and a case in which all the components thereof are each formed of the metal sintered compact.

The metal sintered compact described above may be formed by sintering (heating at a sintering temperature or higher) a green compact of raw-material powder made of alloyed powder containing: metal powder of an iron-based alloy as a main component; and at least chromium of from 0.5 mass % to 20 mass % and molybdenum of 3 mass % or less. Specifically, the metal sintered compact may be formed by sintering a green compact of alloyed powder containing, for example, chromium of 1.5 mass % and molybdenum of 0.2 mass %, and the balance containing an iron-based alloy and inevitable impurities. Note that, the alloyed powder here conceptually comprises both partially alloyed powder and fully alloyed powder.

The metal sintered compact described above may be formed by sintering a green compact granules of raw-material powder containing metal powder of an iron-based alloy as a main component.

In the structure described above, porous structures of at least raceway surfaces or the track grooves are densified through plastic working to a higher degree than other regions. When the raceway surfaces or the track grooves are densified, the number of pores that cause stress concentration decreases, and cracks therefrom are less liable to be generated. As the plastic working, there may be employed a burnishing process.

It is desired that the raw-material powder used for forming the green compact contain a lubricant for reducing a frictional force between particles of the raw-material powder and between the particles and the molding die set, and in particular, contain a solid lubricant that is liquefied by receiving a pressing force at the time of forming the green compact, and dispersed and penetrated between the particles of the raw-material powder. That is, the metal sintered compact may be formed by heating a green compact of the raw-material powder that is mixed with a solid lubricant. With this, the green compact can be smoothly released from the molding die set, and hence the metal sintered compact can be obtained with higher accuracy.

The metal sintered compact described above may be formed, for example, by sintering the green compact at 1,150° C. or more and 1,300° C. or less, the green compact being formed by pressurizing the raw-material powder with a pressing force of 800 MPa or more and 1,100 MPa or less. In this case, in order to prevent oxidation of the raw-material powder (metal powder), and further the metal sintered compact as much as possible, it is desired that the metal sintered compact described above be formed by sintering the green compact in an inert gas atmosphere or under vacuum.

Among the components each formed of the metal sintered compact described above, a component having a ring shape is subjected to a cold rolling process. Porous structures of an inner surface and an outer surface are densified to a higher degree than other regions. In this way, the metal sintered compact can be manufactured not by a CIP method or an HIP method but by general powder metallurgical pressing, and hence is suited to a series production. In addition, the metal sintered compact is formed through the cold rolling process, and hence material yields are increased. As a result, dimensional accuracy close to that of a finished product can be obtained. Further, the porous structure of the surface of the component having the ring shape, which is subjected to the cold rolling process, is densified to a higher degree than the other regions, and hence a strength thereof can be enhanced.

The above-mentioned component having the ring shape comprises the cage of the constant velocity universal joint in which the outer joint member comprises the track grooves, in which the inner joint member comprises the track grooves, and in which the torque transmitting members comprise balls that are engaged between the track grooves, the balls being held by a cage. Further, the component having the ring shape comprises rollers of the tripod type constant velocity universal joint in which the inner joint member comprises the tripod member, in which the tripod member comprises the rollers mounted thereto in a freely rotatable manner, and in which the rollers are engaged with the track grooves of the outer joint member. In this way, strengths of the cage to be slid and fitted and the rollers to be rolled can be enhanced. Specifically, the constant velocity universal joint comprising the above-mentioned cage comprises a Rzeppa type constant velocity universal joint and an undercut free type constant velocity universal joint, and as a plunging type constant velocity universal joint, comprises a double offset type constant velocity universal joint and a cross-groove type constant velocity universal joint. Among those constant velocity universal joints, the appropriate number of the balls is from approximately three to ten.

Effects of the Invention

According to one embodiment of the present invention, the components of the constant velocity universal joint can be mass-produced with high processability. Thus, this advantage contributes to cost reduction of the constant velocity universal joint having requisite performance, a requisite strength, and a requisite life.

Further, when the cold rolling process is performed on the component having the ring shape among the components each formed of the metal sintered compact, the metal sintered compact can be manufactured by general powder metallurgical pressing, and hence is suited to a series production. In addition, when the metal sintered compact is formed through the cold rolling process, material yields are increased. As a result, dimensional accuracy close to that of a finished product can be obtained. Further, the porous structure of the surface of the component having the ring shape, which is subjected to the cold rolling process, is densified to a higher degree than the other regions, and hence a strength thereof can be enhanced.

BRIEF DESCRIPTION OF DRAWINGS

FIG. 3b is a horizontal sectional view taken along the line D-D in FIG. 3a.

FIG. 5b is a horizontal sectional view taken along the line F-F in FIG. 5a.

FIG. 7a is a partial vertical sectional view of a constant velocity universal joint according to a second embodiment of the present invention.

FIG. 7b is a front view of the constant velocity universal joint according to the second embodiment.

FIG. 8a is a partial vertical sectional view of a constant velocity universal joint according to a third embodiment of the present invention.

FIG. 8b is a front view of the constant velocity universal joint according to the third embodiment.

FIG. 10 is a partial vertical sectional view of a constant velocity universal joint according to a fifth embodiment of the present invention.

FIG. 21 is a view of a roller of the constant velocity universal joint according to the tenth embodiment.

FIG. 23b is a horizontal sectional view taken along the line H-H in FIG. 23a.

FIG. 25b is a horizontal sectional view taken along the line K-K in FIG. 25a.

FIG. 26 is a schematic view of the roller of the constant velocity universal joint after a cold rolling process according to the tenth embodiment.

EMBODIMENTS OF THE INVENTION

In the following, description is made of embodiments of the present invention with reference to the drawings.

Figure 1:
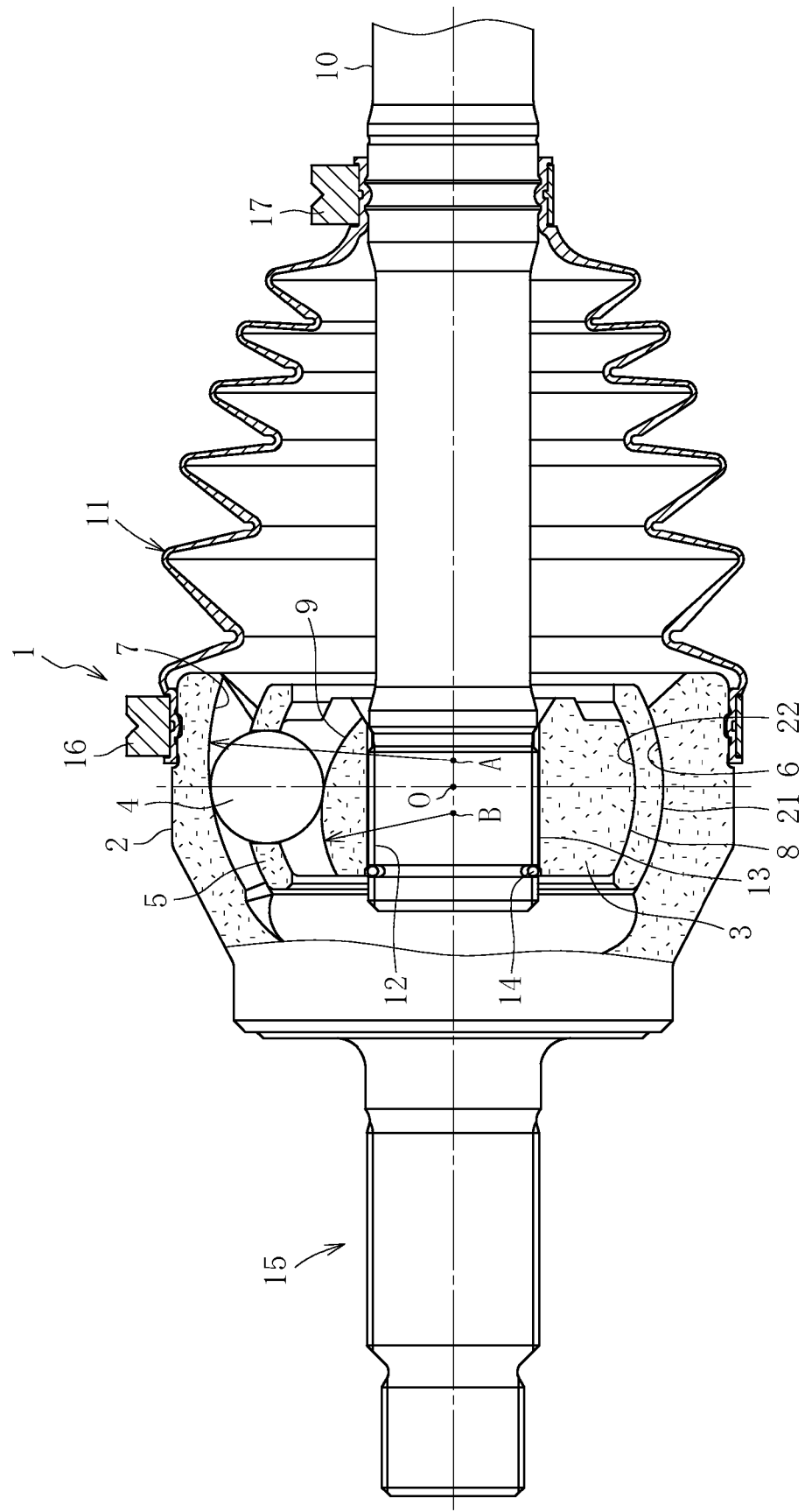
FIG. 1 is a partial vertical sectional view of a constant velocity universal joint according to a first embodiment of the present invention.

Description is made of a constant velocity universal joint according to a first embodiment of the present invention with reference to FIGS. 1 to 5 and 23a to 25b. A constant velocity universal joint 1 illustrated in FIG. 1 is a Rzeppa type constant velocity universal joint that is a fixed type constant velocity universal joint, and FIG. 1 illustrates an example in which the constant velocity universal joint 1 is applied to an automotive drive shaft. The constant velocity universal joint 1 comprises an outer joint member 2, an inner joint member 3, balls 4, and a cage 5. The outer joint member 2 has a spherical inner peripheral surface 6 provided with six track grooves 7 formed equiangularly along an axial direction. The inner joint member 3 has a spherical outer peripheral surface 8 provided with track grooves 9 formed equiangularly along the axial direction so as to face the track grooves 7 of the outer joint member 2. Six balls 4 for transmitting torque are interposed between the track grooves 7 of the outer joint member 2 and the track grooves 9 of the inner joint member 3. The cage 5 for holding the balls 4 is arranged between the spherical inner peripheral surface 6 of the outer joint member 2 and the spherical outer peripheral surface 8 of the inner joint member 3. The track grooves 7 and 9 and the balls 4 are normally held in contact with each other at a contact angle (approximately from 30° to 45°), and hence the track grooves 7 and 9 and the balls 4 are held in contact with each other actually at positions on a side surface side of the track grooves 7 and 9, which are slightly spaced apart from groove bottoms of the track grooves 7 and 9. The inner joint member 3 has an inner peripheral hole provided with female splines 12 that are fitted to male splines 13 formed at an axial end of an intermediate shaft 10 and are fixed in the axial direction with a stopper ring 14. The outer joint member 2 is formed integrally with a shaft portion 15 to be connected to a wheel bearing device (not shown). Both ends of a boot 11 are mounted to an outer periphery of the outer joint member 2 and an outer periphery of the intermediate shaft 10, and fixed by fastening with boot bands 16 and 17 so as to seal an inside of the joint. Grease is sealed as a lubricant in the inside of the joint.

As illustrated in FIG. 1, a center of curvature of each of the spherical inner peripheral surface 6 of the outer joint member 2 and the spherical outer peripheral surface 8 of the inner joint member 3 is formed at a joint center O. Meanwhile, a center of curvature A of the track grooves 7 of the outer joint member 2 and a center of curvature B of the track grooves 9 of the inner joint member 3 are offset by equal distances in the axial direction with respect to the joint center O. Thus, the track grooves 7 and 9 of the outer joint member 2 and the inner joint member 3 each have a wedge-like shape expanding to an opening side, and a push-out force toward the opening side is applied to the balls 4 interposed between both the track grooves 7 and 9. The push-out force generates pocket loads between the balls 4 and pocket surfaces of the cage 5, and contact forces between a spherical outer peripheral surface 21 of the cage 5 and the spherical inner peripheral surface 6 of the outer joint member 2 and between a spherical inner peripheral surface 22 of the cage 5 and the spherical outer peripheral surface 8 of the inner joint member 3. Thus, the cage 5 needs to be excellent in mechanical strength. With such a structure, when the joint forms an operating angle, the balls 4 are guided constantly into a plane obtained by bisection of an angle formed between both axial lines of the outer joint member 2 and the inner joint member 3. As a result, rotational torque is transmitted between the two axes at a constant velocity.

Figure 2B:
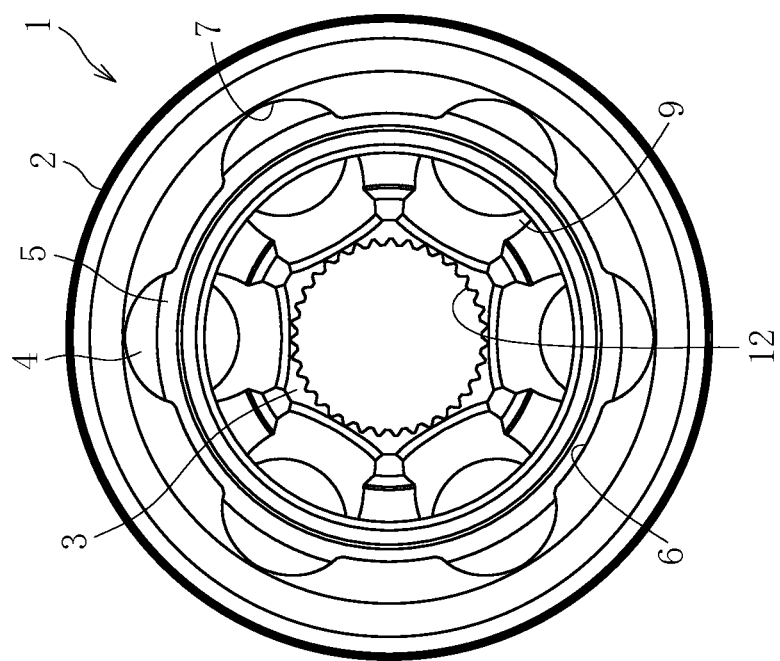
FIG. 2b is a front view of the constant velocity universal joint.
Figure 2A:
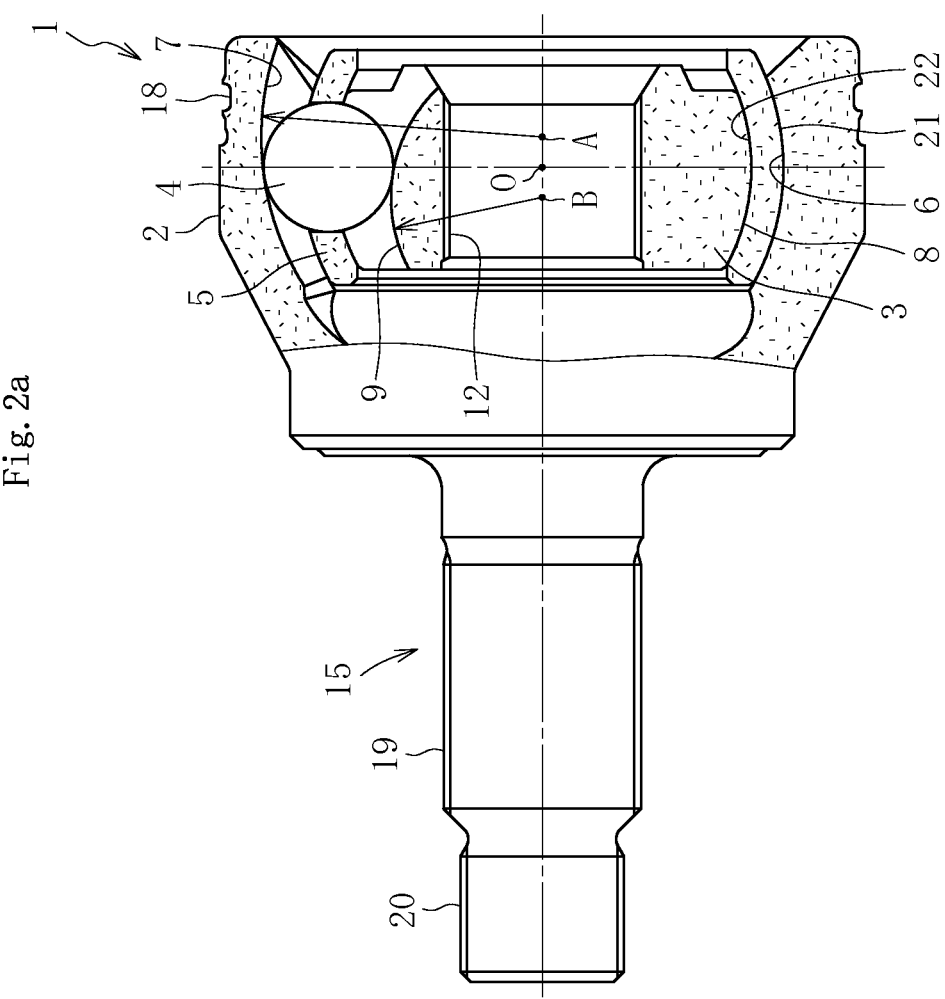
FIG. 2a is another partial vertical sectional view of the constant velocity universal joint according to the first embodiment.

FIGS. 2a and 2b separately illustrate a part of the constant velocity universal joint 1. FIG. 2a is a partial vertical sectional view of the constant velocity universal joint 1, and FIG. 2b is a front view thereof. In this embodiment, the outer joint member 2, the inner joint member 3, and the cage 5 of the constant velocity universal joint 1 are each formed of a metal sintered compact. A boot-mounting groove 18 is formed along the outer periphery on the opening side of the outer joint member 2, and the shaft portion 15 comprises male splines 19 that are fitted to a hub wheel of the wheel bearing device (not shown), and a fastening/fixing threaded portion 20 formed at an axial end of the shaft portion 15. As illustrated in FIG. 2b, the female splines 12 are formed along the inner peripheral hole of the inner joint member 3, and fitted to the male splines 13 at the axial end of the intermediate shaft 10 illustrated in FIG. 1.

Figure 3A:
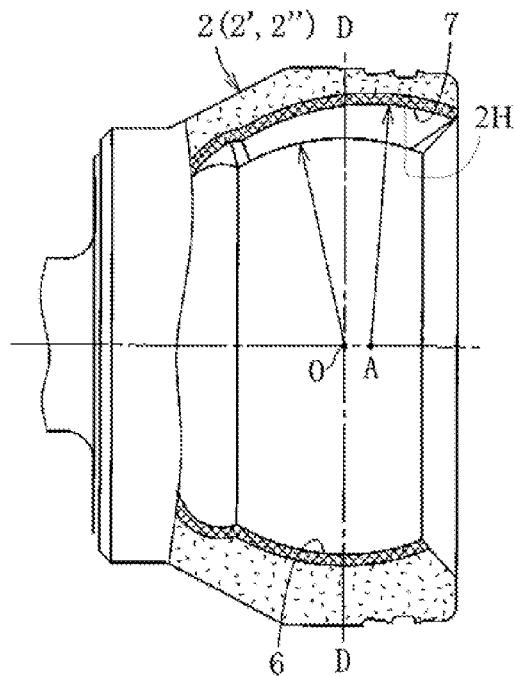
FIG. 3a is a partial vertical sectional view of an outer joint member of the constant velocity universal joint.
Figure 3B:
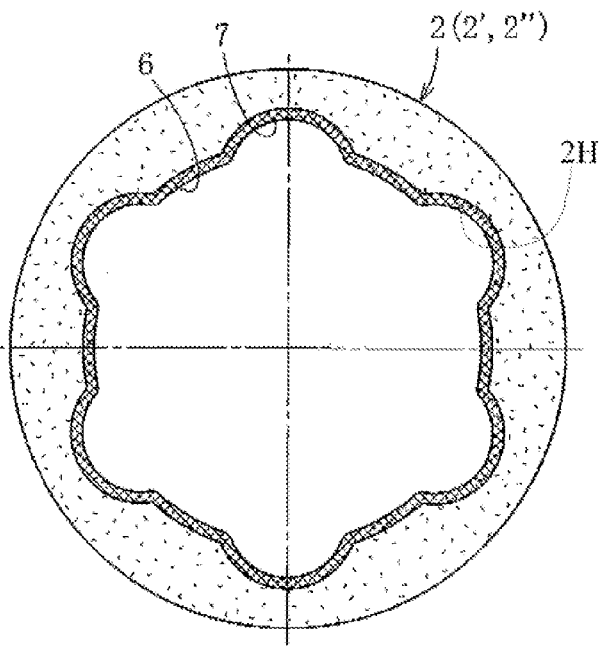
Figure 4A:
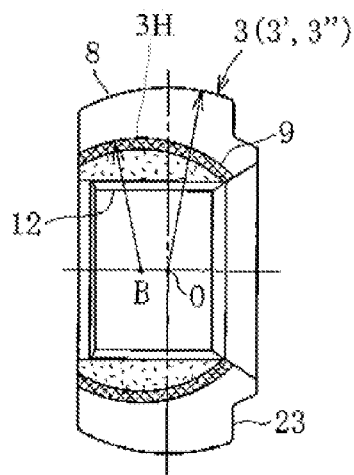
FIG. 4a is a vertical sectional view taken along the line E-E in FIG. 4b, for illustrating an inner joint member of the constant velocity universal joint.
Figure 4B:
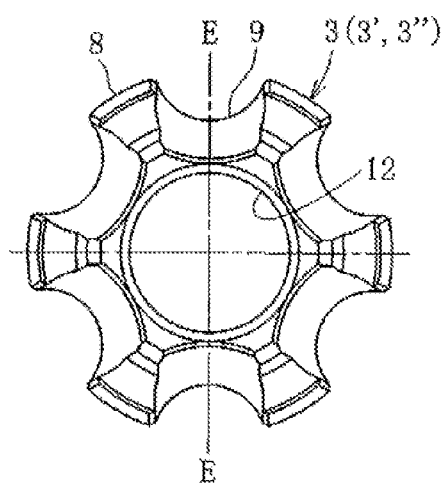
FIG. 4b is a front view of the inner joint member.
Figure 5A:
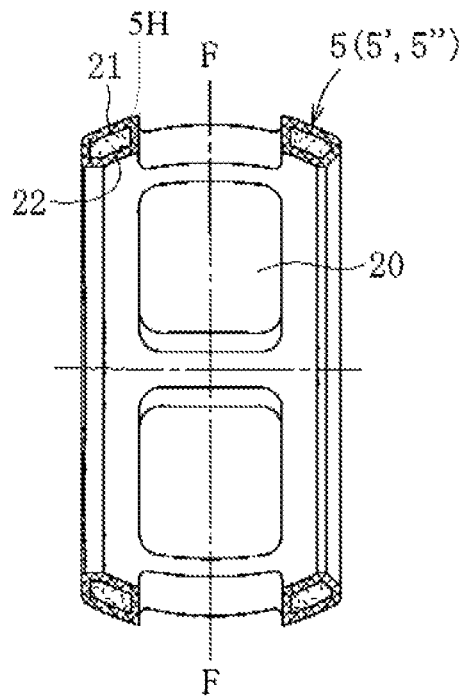
FIG. 5a is a vertical sectional view taken along the line G-G of FIG. 5b, for illustrating a cage of the constant velocity universal joint.
Figure 5B:
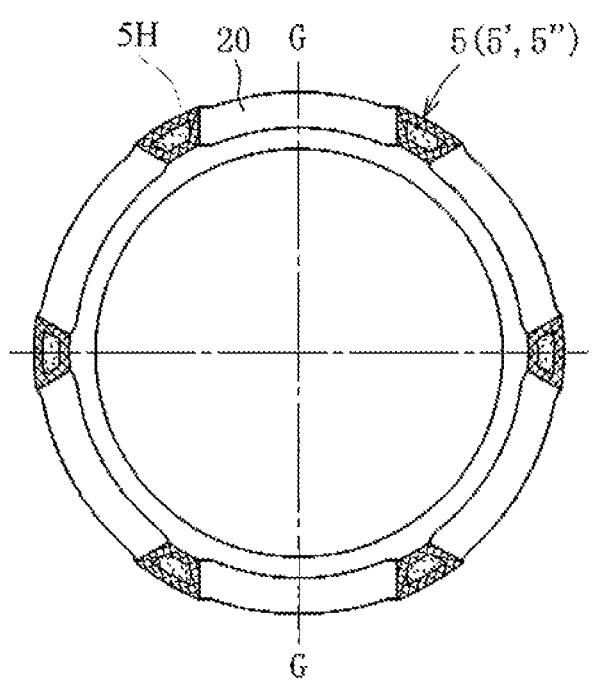

FIGS. 3a to 5b illustrate the components of the constant velocity universal joint 1. FIGS. 3a and 3b are views of the outer joint member 2 alone. FIG. 3a is a vertical sectional view, and FIG. 3b is a horizontal sectional view taken along the line D-D in FIG. 3a. In those figures, a green compact of the outer joint member 2 is denoted by reference symbol 2', and a metal sintered compact thereof is denoted by reference symbol 2". The green compact 2' and the metal sintered compact 2" are partially slightly different in shape from the outer joint member 2 as a finished product, but illustration of the difference is omitted to simplify the description. The same applies to the following views of the components alone. FIGS. 4a and 4b are views of the inner joint member 3 alone. FIG. 4b is a front view, and FIG. 4a is a vertical sectional view taken along the line E-E in FIG. 4b. A cutout portion 23 illustrated in FIG. 4a is configured to enable the inner joint member 3 to be inserted and assembled into pockets 20 (refer to FIGS. 5a and 5b) of the cage 5 at the time of assembly of the inner joint member 3 into the cage 5. FIGS. 5a and 5b are views of the cage 5 alone. FIG. 5a is a vertical sectional view of a center plane of the pockets 20 (taken along the line G-G in FIG. 5b), and FIG. 5b is a horizontal sectional view taken along the line F-F in FIG. 5a.

Figure 6:
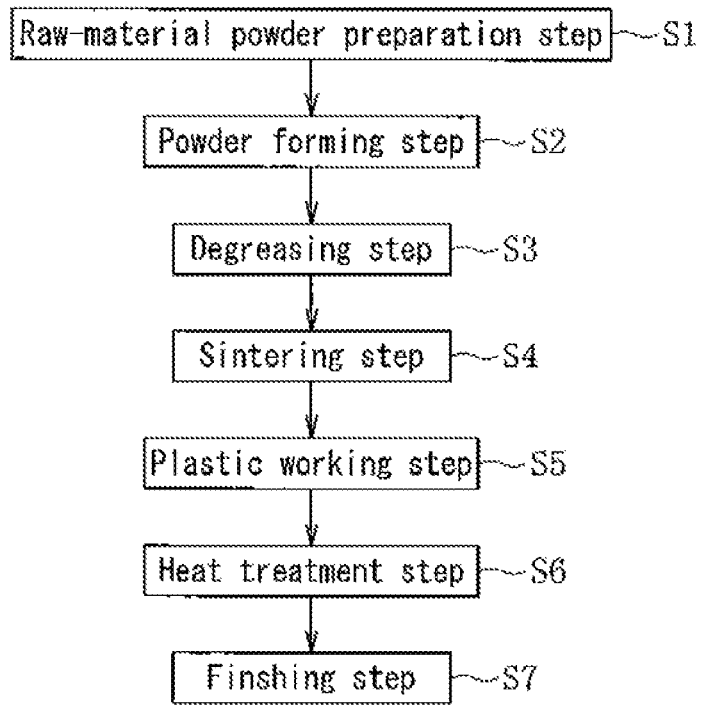
FIG. 6 is a chart illustrating a manufacturing flow of a metal sintered compact.

As illustrated in FIGS. 3a to 5b, the outer joint member 2, the inner joint member 3, and the cage 5 are formed of the metal sintered compacts 2", 3", and 5" formed by sintering a green compact of raw-material powder containing metal powder as a main component, and each have a hardened layer 2H, 3H and 5H, respectively, formed on surfaces thereof through heat treatment. The outer joint member 2, the inner joint member 3, and the cage 5 configured as described above are each manufactured, as illustrated in FIG. 6, mainly by a raw-material powder preparation step S1, a powder forming step S2, a degreasing step S3, a sintering step S4, a plastic working step S5, a heat treatment step S6, and a finishing step S7. This manufacturing flow is basically the same on each of the outer joint member 2, the inner joint member 3, and the cage 5, and hence those three members are described side by side in the following description.

In the raw-material powder preparation step S1, raw-material powder as a molding material for each of the outer joint member 2, the inner joint member 3, and the cage 5 to be formed of a metal sintered compact is prepared and produced. The raw-material powder may be partially alloyed powder or fully alloyed powder containing, for example, iron (Fe) as a main component, and at least chromium (Cr) of from 0.5 mass % to 20 mass % and molybdenum (Mo) of 3 mass % or less. Here, there is used fully alloyed powder containing not only chromium of 1.5 mass % and molybdenum of 0.2 mass % but also carbon (C) of 0.3 mass %, and iron as the balance.

As appropriate, the raw-material powder may be mixed with, as an additive, solid lubricants of copper, molybdenum disulfide, graphite, and the like, and lubricants for ease of molding, such as zinc stearate, and ethylene-bis-stearamide that is a non-metallic lubricant.

In the powder forming step S2, the raw-material powder described above is compacted so as to form the green compacts 2', 3', and 5' having shapes of the outer joint member 2, the inner joint member 3, and the cage 5 (refer to FIGS. 3a to 5b). The green compacts 2', 3', and 5' are formed through compression so that the metal sintered compacts 2", 3", and 5" formed through heating at a sintering temperature or higher each have a high relative density of 80% or more and less than 100%, desirably, 90% or more and less than 100%. The raw-material powder used in this embodiment contains iron as a main component, and the iron has a density of approximately 7.8 g/cm$^3$. Thus, the green compacts 2', 3', and 5' are desirably formed through compression into the metal sintered compacts 2", 3", and 5" each having a density of from 7.3 g/cm$^3$ to 7.5 g/cm$^3$.

Specifically, the green compacts 2', 3', and 5' are formed by setting a molding die set that forms a cavity conforming to a shape of a green compact in a CNC press machine having, for example, a servo-motor as a drive source, charging the raw-material powder described above into the cavity, and pressurizing the raw-material powder with a pressing force of from 800 MPa to 1,100 MPa. At the time of forming the green compacts 2', 3', and 5', the molding die set may be heated to 70° C. or more. The track grooves 7 and the spherical inner peripheral surface 6 of the green compact 2' of the outer joint member, and the track grooves 9 and the spherical outer peripheral surface 8 of the green compact 3' of the inner joint member each have a shape curved in the joint axial direction. Thus, the molding die set that forms the cavity may appropriately comprise dies that are split in a circumferential direction.

When the raw-material powder is compressed so as to obtain the green compacts 2', 3', and 5' to be formed into the metal sintered compacts 2", 3", and 5" each having the high relative density within the above-mentioned range, surfaces of the green compacts 2', 3', and 5' may adhere to an inner wall surface of the cavity. As a result, there arises a risk in that the green compacts 2', 3', and 5' cannot be smoothly released from the molding die set. In view of this, in this embodiment, the solid lubricant is mixed into the raw-material powder. Thus, at the time of forming the green compacts 2', 3', and 5', the solid lubricant can be liquefied with the above-mentioned high pressing force, and the liquefied solid lubricant can be dispersed and penetrated between particles of the raw-material powder. Despite their brittleness, the green compacts 2', 3', and 5' can be smoothly released, and deformation of the green compacts 2', 3', and 5' along with the release can be avoided.

In the degreasing step S3, the lubricant and the like contained in the green compacts 2', 3', and 5' are removed. The degreasing can be performed under the same condition as that in cases of producing general sintered metal products.

In the sintering step S4, the degreased green compacts 2', 3', and 5' are heated at the sintering temperature or higher so as to sinter and bond adjacent ones of the particles of the raw-material powder to each other. In this way, the metal sintered compacts 2", 3", and 5" are formed. The raw-material powder contains iron as a main component, and hence, in order to form the metal sintered compacts 2", 3", and 5" while preventing oxidation as much as possible, the green compacts 2', 3', and 5' are arranged, for example, in a mixed gas atmosphere of a nitrogen gas and a hydrogen gas, and heated at from 1,150° C. to 1,300° C. (for example, 1,250° C.) for sixty minutes. Note that, the sintering of the green compacts 2', 3', and 5' may be performed not only in an inert gas atmosphere as described above, but also under vacuum.

In the plastic working step S5, the track grooves 7 and 9, and the spherical surfaces 6, 8, 21, and 22, of the metal sintered compacts 2", 3", and 5" formed as described above are subjected to plastic working such as a burnishing process, and hence can be formed to have higher density as schematically illustrated in FIGS. 23a, 23b, 24a, 24b, 25a and 25b. Note that, in consideration of design ability of the molding die set for the green compacts, it is desired that the threaded portion 20 at the axial end portion of the outer joint member 2 (refer to FIG. 2a) be formed through a rolling process on the metal sintered compact 2". Further, it is desired that the boot-mounting groove 18 of the outer joint member 2 (refer to FIG. 2a) and helical oil grooves of a shaft portion 76 of an outer joint member 62 (refer to FIG. 10) be formed through a turning process or a rolling process on the metal sintered compact 2".

The green compacts 2', 3', and 5' are sintered under the condition described above, and then the plastic working is performed on the track grooves 7 and 9, and the spherical surfaces 6, 8, 21, and 22. With this, the metal sintered compacts 2", 3", and 5" are each formed to have the relative density of 80% or more and less than 100%. Further, through the plastic working on the track grooves 7 and 9, and the spherical surfaces 6, 8, 21, and 22, porous structures of the parts subjected to the plastic working are densified in comparison with those of other regions. Thus, on the metal sintered compacts 2", 3", and 5" subjected to the plastic working step S5, at least regions in which the track grooves 7 and 9, and the spherical surfaces 6, 8, 21, and 22 are formed are further densified (formed to have higher density). As a result, a higher mechanical strength and a longer durability life are achieved. When the track grooves 7 and 9, and the spherical surfaces 6, 8, 21, and 22 are densified, there is an advantage in that the number of pores that cause stress concentration decreases, and cracks therefrom are less liable to be generated. In the present invention, an increase in density of the parts subjected to the plastic working described above means formation of the metal sintered compacts 2", 3", and 5" comprising the parts subjected to the plastic working to have the relative density of 80% or more and less than 100%. It suffices that the plastic working step S5 be performed only when necessary, and hence need not necessarily be performed.

The heat treatment step S6 is a step of performing heat treatment such as quenching treatment on the metal sintered compacts 2", 3", and 5" so as to form hardened layers 2H, 3H and 5H, respectively, on the surfaces thereof. With this, the metal sintered compacts 2", 3", and 5" can each be provided with an even higher surface hardness. As a result, a Rockwell C-scale hardness (HRC) of 55 or more, preferably 57 or more, which is requisite to each of the track grooves 7 and 9, and the spherical surfaces 6, 8, 21, and 22 of the metal sintered compacts 2", 3", and 5", can be secured. As a method of quenching, there may be employed immersion quenching and carburizing-and-quenching, and those methods can be appropriately selected in accordance with materials and product specifications.

The finishing step S7 is a step of performing a finishing process such as a grinding process on predetermined parts of the metal sintered compacts 2", 3", and 5" so as to finish desired parts of the metal sintered compacts 2", 3", and 5" with much higher accuracy. Further, pore sealing treatment can be appropriately performed on desired parts of the metal sintered compacts 2", 3", and 5". It suffices that the finishing step S7 be performed as appropriate, and hence need not necessarily be performed.

As described above, the outer joint member 2, the inner joint member 3, and the cage 5 of the constant velocity universal joint 1 according to the first embodiment of the present invention are formed of the metal sintered compacts 2", 3", and 5" each having the high relative density of 80% or more and less than 100%. Thus, a requisite mechanical strength and a requisite durability life can be secured. Further, by performing heat treatment such as quenching treatment on the metal sintered compacts 2", 3", and 5" so as to form hardened layers on the surfaces thereof, the metal sintered compacts 2", 3", and 5" can each be provided with an even higher surface hardness. As a result, a Rockwell C-scale hardness (HRC) of 55 or more, preferably 57 or more, which is requisite to each of the track grooves 7 and 9, and the spherical surfaces 6, 8, 21, and 22 of the metal sintered compacts 2", 3", and 5", can be secured. In addition, the porous structures are densified through the plastic working on the metal sintered compacts 2", 3", and 5", and hence higher mechanical strengths and longer durability lives of the track grooves 7 and 9, and the spherical surfaces 6, 8, 21, and 22 are achieved. Thus, the outer joint member 2, the inner joint member 3, and the cage 5 that are components of the constant velocity universal joint 1 having requisite functions can be mass-produced with high processability, and even complicated shapes thereof can be formed without waste of materials. In this way, cost reduction of the constant velocity universal joint 1 can be achieved. Further, despite the high density, the metal sintered compacts 2", 3", and 5" each have an appropriate number of pores, and hence it is possible to achieve a contact state in which stick-slip is less liable to occur between surfaces of the track grooves 7 and 9 and the balls 4, and the spherical surfaces 6, 8, 21, and 22 in the fixed type constant velocity universal joint. In addition, due to a high holding capability of the grease as a lubricant, generation of the stick-slip and noise at low temperature can be suppressed.

Description is made above of the metal sintered compact of one embodiment of the present invention. In this context, specific means for obtaining the metal sintered compacts 2", 3", and 5" each formed to have the high relative density of 80% or more and less than 100% is not limited to the means described above. For example, the metal sintered compacts 2", 3", and 5" may be obtained by forming a green compact through pressurization on granules formed through granulation of the raw-material powder, and then bonding the green compact through sintering and heating. In this case, the metal sintered compacts 2", 3", and 5" are obtained by the following procedure.

First, raw-material powder containing an iron-based alloy as a main component, and blended as appropriate with particles of copper, nickel, molybdenum disulfide, graphite, and the like is produced. For example, raw-material powder containing iron as a main component and carbon of 0.3% or more is preferred. At this time, a powder particle size (D50) of the raw-material powder is set to 20 μm or less, preferably 10 μm or less. This is because, when the powder particle size of the raw-material powder is large, large pores are formed between particles of the raw-material powder forming a green compact, which cannot be closed even when the green compact is heated to form a metal sintered compact. As a result, density is difficult to increase. In contrast, when the powder particle size (D50) of the raw-material powder is set to 20 μm or less, the pores can be closed at the time of sintering, and hence density can be increased.

Next, the above-mentioned raw-material powder is granulated to form granules. When the raw-material powder is granulated in this way, fluidity of the raw-material powder in the inside of the molding die set for forming green compacts is enhanced, and hence moldability can be secured. For example, the granules are each an aggregate of the particles of the above-mentioned raw-material powder to which lubricants for reducing friction loss at the time of molding, a mold releasing agent, and a granulating agent having a function of glue for imparting an appropriate strength to the granules are added. The lubricants comprise zinc stearate that is a metallic lubricant, and ethylene-bis-stearamide that is a non-metallic lubricant. The granulating agent comprises an organic matter.

The powder particle size (D50) of the granules is preferably set to 500 μm or less. This is because, when the powder particle diameter exceeds 500 μm, chargeability with respect to the cavity is deteriorated, and hence the granules cannot be charged by a necessary and sufficient amount. As a result, a green compact having a high density may be difficult to obtain, resulting in a difficulty in obtaining a sintered compact. Note that, in consideration of the fluidity, it is preferred that the granules particularly have a spherical shape.

Then, the powder forming step of forming a green compact by pressurizing the granules charged into the cavity of the molding die set is executed, and the degreasing step of decreasing the lubricant, the granulating agent, and the like contained in the green compact is executed. After that, the sintering step of heating the green compact at a sintering temperature or higher is executed. In this way, the metal sintered compacts 2", 3", and 5" each having the high relative density within the above-mentioned range can be obtained.

Note that, the metal sintered compacts each having the high relative density within the above-mentioned range can be obtained as in the following specific example. Raw-material powder containing an iron-based alloy as a main component and having a powder particle size (D50) set to 10 μm is granulated so as to form granules each having a powder particle size (D50) of 120 μm. Then, the granules are pressurized at 800 MPa so as to form a green compact, which is degreased at 750° C. for thirty minutes. Then, the green compact thus degreased is heated at 1,200° C. for sixty minutes. As a result, the metal sintered compacts 2", 3", and 5" of the granules thus obtained each have the relative density within the above-mentioned range, which is markedly higher than that of a metal sintered compact obtained by compacting and sintering powder press molding powder that does not have the granules.

The metal sintered compacts 2", 3", and 5" each having the high density can be obtained by the procedure described above probably for the following reason. Above all, use of raw-material powder having a minute particle diameter (fine powder) is conceived as an example of effective means for obtaining the metal sintered compacts 2", 3", and 5" each having the high density. However, when the fine powder is pressurized as it is, moldability is deteriorated by friction loss. Thus, such means cannot be employed. In contrast, with use of the granules obtained by granulating the raw-material powder to have an appropriate particle diameter as described above, the friction loss is reduced despite use of the fine powder, and the fluidity of the raw-material powder in the die set can be enhanced. Thus, the moldability can be enhanced, and the fine powder can be used. In this way, surface areas of the particles of the raw-material powder are increased, and hence sintering properties of the particles of the raw-material powder, which are firmly bonded to each other, can be enhanced. As a result, the metal sintered compacts 2", 3", and 5" each having the high density can be obtained.

Further, with use of the raw-material powder having the powder particle size (D50) of 20 μm or less, preferably 10 μm or less, a larger number of pores were closed at the time of sintering. In addition, with use of the granules having the powder particle size (D50) of 500 μm or less, the chargeability of the granules with respect to the molding die set for the green compacts was enhanced. It is conceived that those factors contribute to the increase in density of the metal sintered compacts 2", 3", and 5".

Next, description is made of a second embodiment of the present invention with reference to FIGS. 7a and 7b. FIG. 7a is a partial vertical sectional view of a constant velocity universal joint according to this embodiment, and FIG. 7b is a front view thereof. The parts having the same functions as those in the first embodiment described above are denoted by the same reference symbols, and redundant description thereof is omitted. The same applies to a third embodiment of the present invention described below.

In the constant velocity universal joint 1 according to the second embodiment, only the cage 5 is formed of a metal sintered compact, and the outer joint member 2, the inner joint member 3, and the balls 4 are formed of a generally used ingot material. Internal shapes of components of the constant velocity universal joint 1 according to this embodiment, in other words, the track grooves 7 and the spherical inner peripheral surface 6 of the outer joint member 2, the track grooves 9 and the spherical outer peripheral surface 8 of the inner joint member 3, the spherical outer peripheral surface 21 and the spherical inner peripheral surface 22 of the cage 5, and the balls 4 are the same as those in the first embodiment, and hence redundant description thereof is omitted. The spherical outer peripheral surface 21 of the cage 5 formed of a metal sintered compact is held in spherical contact with the spherical inner peripheral surface 6 of the outer joint member 2, and the spherical inner peripheral surface 22 thereof is held in spherical contact with the spherical outer peripheral surface 8 of the inner joint member 3. The metal sintered compact of the cage 5 also has the high relative density of 80% or more and less than 100%, and a hardened layer 5H is formed on a surface thereof through heat treatment. Thus, a requisite mechanical strength and a requisite durability life can be secured. A composition, properties, and a manufacturing flow of the metal sintered compact are the same as those described above in the first embodiment, and hence description thereof is omitted.

Description is made of the third embodiment of the present invention with reference to FIGS. 8a and 8b. FIG. 8a is a partial vertical sectional view of a constant velocity universal joint according to this embodiment, and FIG. 8b is a front view thereof. In this embodiment, the outer joint member 2 and the inner joint member 3 of the constant velocity universal joint 1 are each formed of a metal sintered compact, and the balls 4 and the cage 5 are formed of a generally used ingot material. The balls 4 are arranged between the outer joint member 2 and the inner joint member 3 each formed of a metal sintered compact, specifically, between the track grooves 7 and the track grooves 9 thereof. The spherical inner peripheral surface 6 of the outer joint member 2 and the spherical outer peripheral surface 8 of the inner joint member 3 are held in spherical contact respectively with the spherical outer peripheral surface 21 and the spherical inner peripheral surface 22 of the cage 5. The metal sintered compact of each of the outer joint member 2 and the inner joint member 3 has the high relative density of 80% or more and less than 100%, and a hardened layer 2H and 5H, respectively, is formed on a surface thereof through heat treatment. Thus, a requisite mechanical strength and a requisite durability life can be secured for the track grooves 7 and 9, the spherical inner peripheral surface 6, and the spherical outer peripheral surface 8. A composition, properties, and a manufacturing flow of the metal sintered compact are the same as those described above in the first embodiment, and hence description thereof is omitted.

Figure 9A:
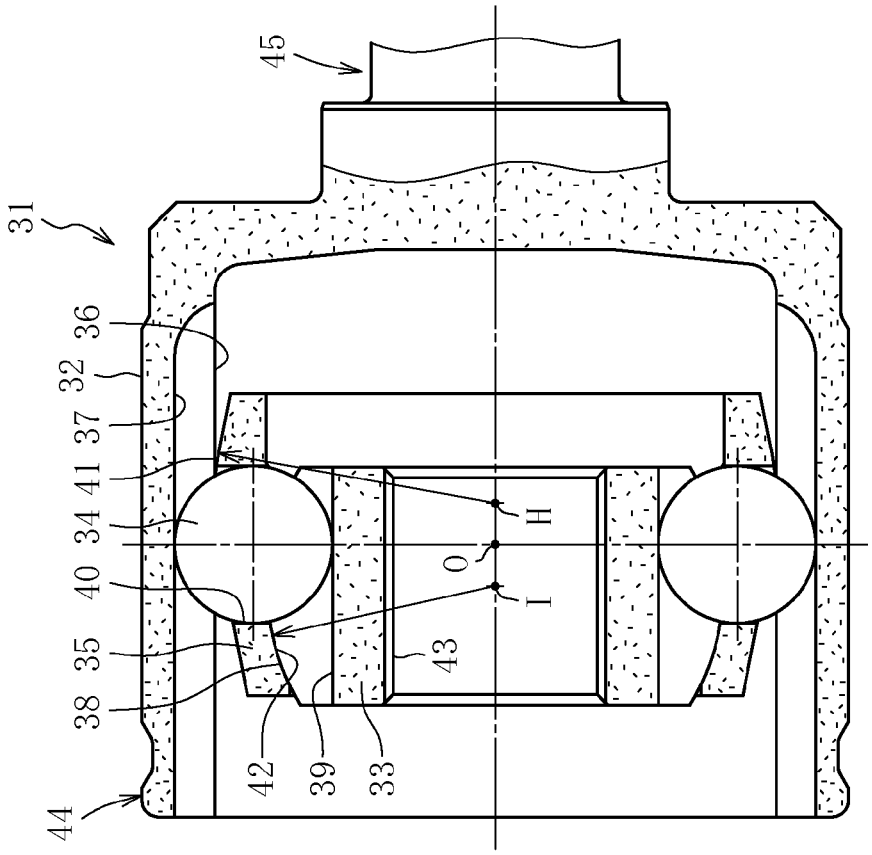
FIG. 9a is a partial vertical sectional view of a constant velocity universal joint according to a fourth embodiment of the present invention.
Figure 9B:
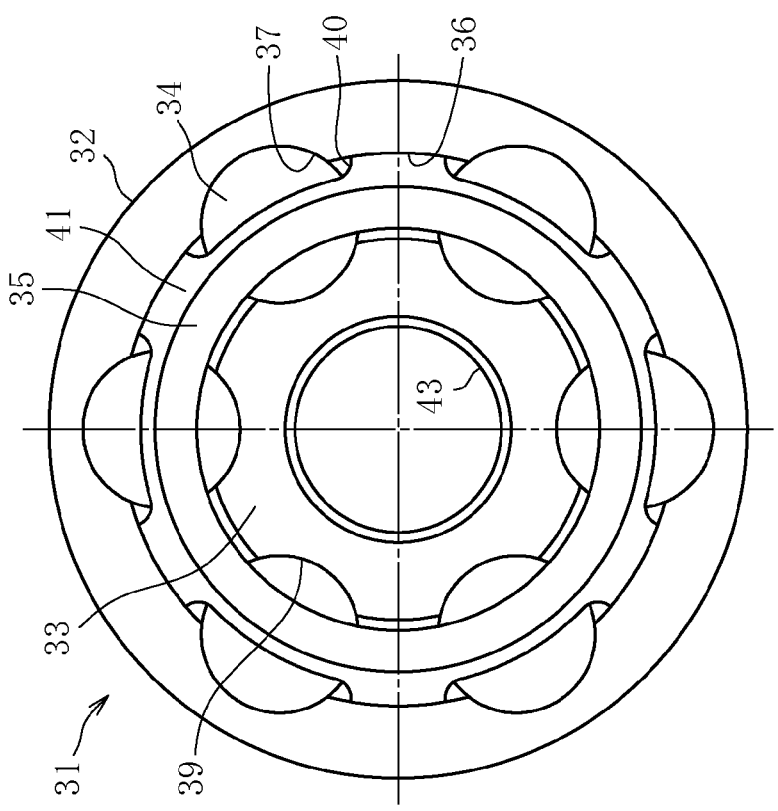
FIG. 9b is a front view of the constant velocity universal joint according to the fourth embodiment.

Description is made of a fourth embodiment of the present invention with reference to FIGS. 9a and 9b. In an example illustrated in this embodiment, a double offset type constant velocity universal joint (DOJ) that is a plunging type constant velocity universal joint of one type is applied to an automotive drive shaft as in the embodiments described above. FIG. 9a is a partial vertical sectional view of a constant velocity universal joint 31 of this embodiment, and FIG. 9b is a front view thereof. The constant velocity universal joint 31 comprises an outer joint member 32, an inner joint member 33, balls 34, and a cage 35. The outer joint member 32 has a cylindrical inner peripheral surface 36 provided with six track grooves 37 formed equiangularly and linearly in the axial direction. The inner joint member 33 has a spherical outer peripheral surface 38 provided with track grooves 39 formed equiangularly and linearly in the axial direction so as to face the track grooves 37 of the outer joint member 32. Six balls 34 for transmitting torque are interposed between the track grooves 37 of the outer joint member 32 and the track grooves 39 of the inner joint member 33. Also in the plunging type constant velocity universal joint 31, as in the fixed type constant velocity universal joint 1 according to the first embodiment, the track grooves 37 and 39 and the balls 34 are normally held in contact with each other at a contact angle (approximately from 30° to 45°). Thus, the track grooves 37 and 39 and the balls 34 are held in contact with each other actually at positions on a side surface side of the track grooves 37 and 39, which are slightly spaced apart from groove bottoms of the track grooves 37 and 39. The cage 35 for holding the balls 34 is arranged between the cylindrical inner peripheral surface 36 of the outer joint member 32 and the spherical outer peripheral surface 38 of the inner joint member 33. The cage 35 comprises pockets 40 for receiving the balls 34, and has a spherical outer peripheral surface 41 fitted to the cylindrical inner peripheral surface 36 of the outer joint member 32 and a spherical inner peripheral surface 42 fitted to the spherical outer peripheral surface 38 of the inner joint member 33. Although not shown, the inner joint member 33 has an inner hole 43 to which an axial end portion of an intermediate shaft is spline-fitted and fixed in the axial direction with a stopper ring. Then, a boot is mounted to an outer periphery of an opening end portion 44 of the outer joint member 32 and an outer periphery of the intermediate shaft, and grease is sealed as a lubricant in the inside of the joint. A shaft portion 45 is formed integrally with a bottom portion on a depth side of the outer joint member 32, and coupled to a side gear of a differential (not shown).

The spherical outer peripheral surface 41 of the cage 35 has a center of curvature H, and the spherical inner peripheral surface 42 of the cage 35 has a center of curvature I. The centers of curvature H and I are offset by equal distances in the axial direction with respect to the joint center O. With this, when the joint forms an operating angle, the balls 34 are guided constantly into a plane obtained by bisection of an angle formed between both axial lines of the outer joint member 32 and the inner joint member 33. As a result, rotation is transmitted between the two axes at a constant velocity.

In the plunging type constant velocity universal joint 31 according to this embodiment, the outer joint member 32, the inner joint member 33, and the cage 35 are each formed of the metal sintered compact having the high relative density of 80% or more and less than 100%, and hardened layers (not shown) are formed on surfaces thereof through heat treatment. Thus, it is possible to secure requisite mechanical strengths and requisite durability lives of the track grooves 37 and 39, the cylindrical inner peripheral surface 36 of the outer joint member 32, the spherical outer peripheral surface 38 of the inner joint member 33, and the spherical outer peripheral surface 41 and the spherical inner peripheral surface 42 of the cage 35. A composition, properties, and a manufacturing flow of each of the metal sintered compacts are the same as those described above in the first embodiment, and hence description thereof is omitted.

Description is made of a fifth embodiment of the present invention with reference to FIG. 10. In the example illustrated in this embodiment, a tripod type constant velocity universal joint that is a plunging type constant velocity universal joint of another type is similarly applied to an automotive drive shaft. A constant velocity universal joint 61 of this embodiment comprises an outer joint member 62, a tripod member 63 as an inner joint member, rolling elements 64, and spherical rollers 65. The outer joint member 62 has an inner peripheral portion provided with three axial track grooves 66, and axial roller guide surfaces 67 are formed on both sides of each of the track grooves 66. The tripod member 63 comprises a boss portion 63a radially provided with three leg shafts 63b (refer to FIG. 12). The spherical rollers 65 are fitted respectively to the leg shafts 63b through intermediation of a large number of the rolling elements 64. Washers 68 and 69 are interposed at both ends of the rolling elements 64, and the washer 69 is positioned with a stopper ring 70. With this, a train of the rolling elements 64 are guided along each of the leg shafts 63b, and the spherical rollers 65 are freely rotatable along the rolling elements 64 and movable in axial line directions of the leg shafts 63b. The spherical rollers 65 are received to be freely rotatable between the roller guide surfaces 67 of the track grooves 66 of the outer joint member 62.

In this way, the roller guide surfaces 67 of the outer joint member 62 and the three leg shafts 63b of the tripod member 63 are engaged in rotation directions with each other through intermediation of the spherical rollers 65, and hence rotational torque is transmitted at a constant velocity from the driving side to the driven side. Further, the spherical rollers 65 roll on the roller guide surfaces 67 while being rotated relative to the leg shafts 63b, and hence relative axial displacement and relative angular displacement between the outer joint member 62 and the tripod member 63 are absorbed.

As illustrated in FIG. 10, the boss portion 63a of the tripod member 63 has an inner hole 72 provided with female splines 73. The female splines 73 and male splines 75 of an intermediate shaft 71 are fitted to each other and fixed in the axial direction with a stopper ring 77. The shaft portion 76 is formed integrally with a bottom portion on a depth side of the outer joint member 62, and coupled to a side gear of a differential (not shown).

Figure 11:
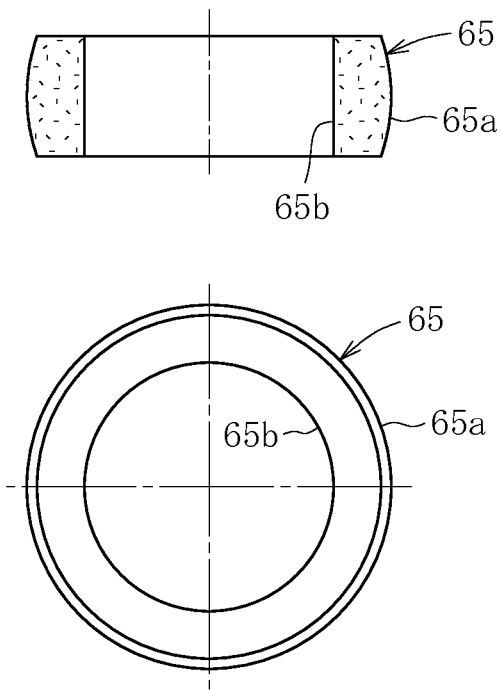
FIG. 11 is a view of a roller of the constant velocity universal joint according to the fifth embodiment.
Figure 12:
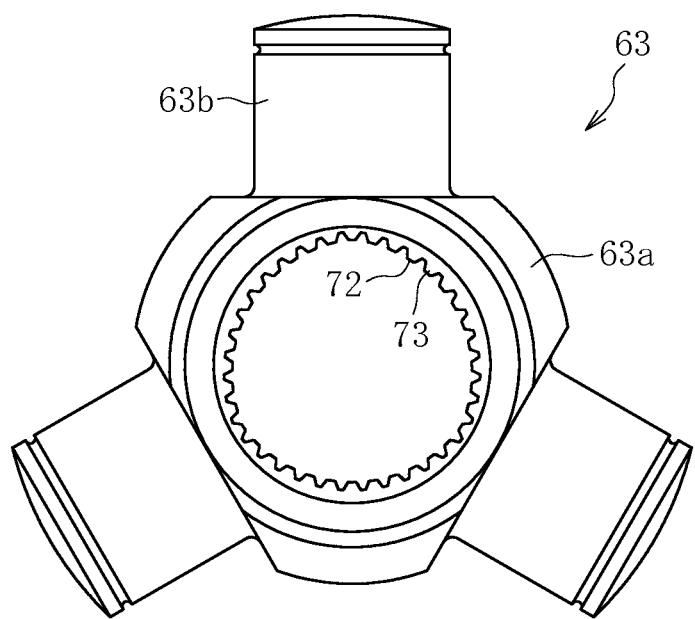
FIG. 12 is a view of a tripod member of the constant velocity universal joint according to the fifth embodiment.

FIG. 11 is a view of the spherical roller 65 alone, and FIG. 12 is a view of the tripod member 63 alone. The spherical roller 65 has a spherical outer surface 65a and a cylindrical inner surface 65b. The spherical outer surface 65a serves as a rolling surface, and is engaged with the track groove 66 (roller guide surfaces 67) of the outer joint member 62. In this way, rolling movement on the roller guide surfaces 67 is performed. The roller guide surfaces 67 are each formed into a circular-arc shape in horizontal cross-section. The cylindrical inner peripheral surface 65b is a rolling surface for the rolling elements (needle rollers) 64. As illustrated in FIG. 12, the tripod member 63 comprises the three leg shafts 63b provided equiangularly and radially from the boss portion 63a, and the spherical rollers 65 are supported to be freely rotatable about the leg shafts 63b through intermediation of the rolling elements 64. The inner hole 72 of the boss portion 63a is provided with the female splines 73, and the female splines 73 are fitted to the male splines 75 formed at an axial end of the intermediate shaft 71.

In this embodiment, the outer joint member 62, the tripod member 63 as an inner joint member, and the spherical rollers 65 that are components of the tripod type constant velocity universal joint 61 are each formed of the metal sintered compact having the high relative density of 80% or more and less than 100%, and hardened layers (e.g., a hardened layer 65H of each of the spherical rollers 65) are formed on surfaces thereof through heat treatment. Thus, it is possible to secure requisite mechanical strengths and requisite durability lives of the track grooves 66 (roller guide surfaces 67) of the outer joint member 62, the spherical rollers 65, and the leg shafts 63b of the tripod member 63. A composition, properties, and a manufacturing flow of the metal sintered compact are the same as those described above in the first embodiment, and hence description thereof is omitted.

Figure 13:
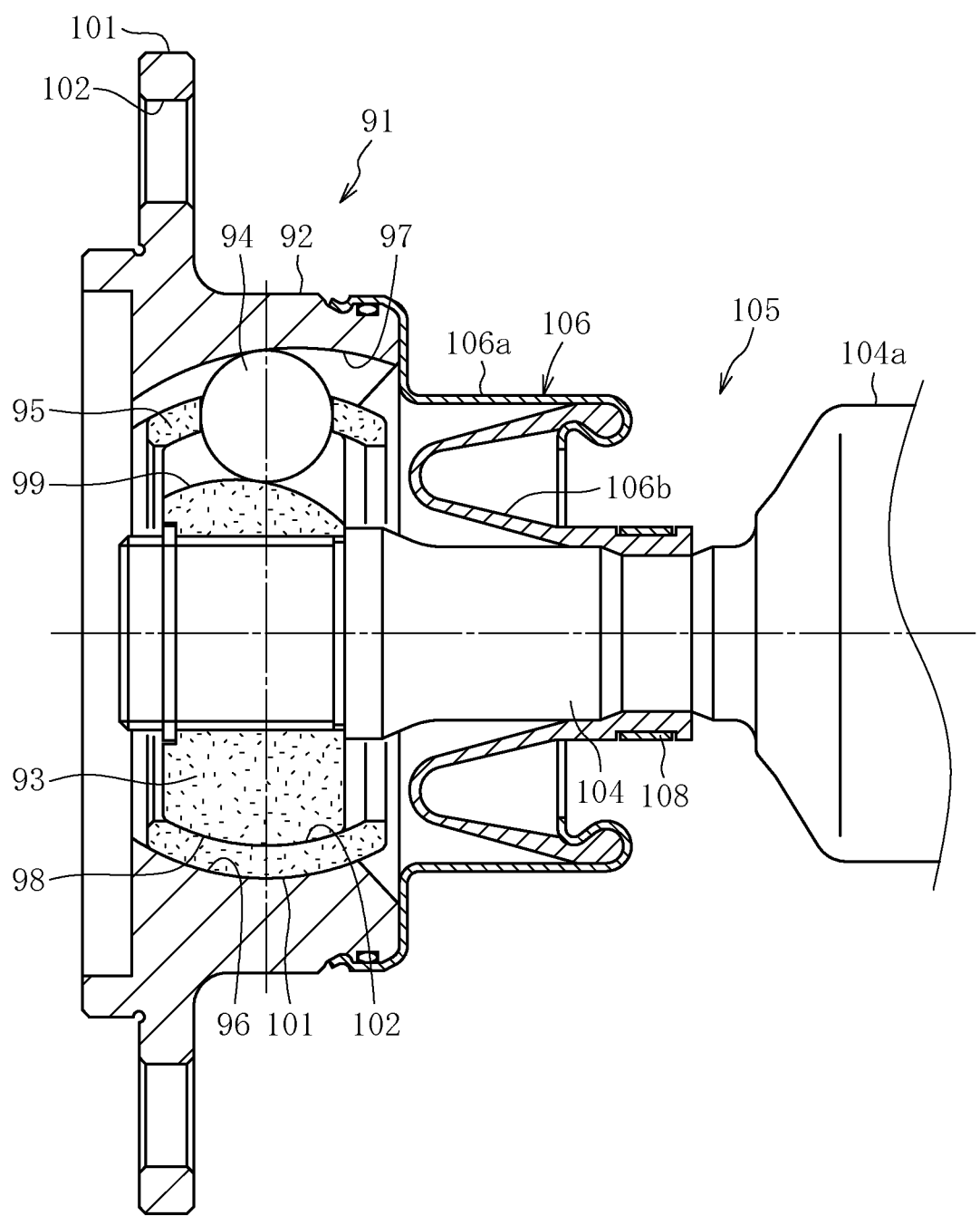
FIG. 13 is a partial vertical sectional view of a constant velocity universal joint according to a sixth embodiment of the present invention.

Description is made of a sixth embodiment of the present invention with reference to FIG. 13. A fixed type constant velocity universal joint according to this embodiment is a fixed type constant velocity universal joint applied to an automotive propeller shaft. A constant velocity universal joint 91 of this embodiment mainly comprises an outer joint member 92, an inner joint member 93, balls 94, and a cage 95. Internal shapes of components of the constant velocity universal joint 91 according to this embodiment, in other words, track grooves 97 and a spherical inner peripheral surface 96 of the outer joint member 92, track grooves 99 and a spherical outer peripheral surface 98 of the inner joint member 93, a spherical outer peripheral surface 101 and a spherical inner peripheral surface 102 of the cage 95, and the balls 94 are the same as those in the first embodiment, and hence redundant description thereof is omitted. A shaft 104 comprises a large diameter pipe portion 104a, and a plunging type constant velocity universal joint or a fixed type constant velocity universal joint (not shown) is coupled to another end of the shaft 104. In this way, a propeller shaft 105 is obtained. A boot 106 comprises a sealing ring 106a fixed by crimping to an outer peripheral surface of an opening portion of the outer joint member 92, and an elastic boot portion 106b comprising one end fixed to the sealing ring 106a and another end mounted to the shaft 104 with a boot band 108. The outer joint member 92 comprises a mounting flange 111 provided on an outer periphery thereof, and is mounted to a counterpart member (not shown) with bolts (not shown) through bolt holes 112.

In this embodiment, among the components of the constant velocity universal joint 91, the inner joint member 93 and the cage 95 are each formed of a metal sintered compact, and the outer joint member 92 and the balls 94 are each formed of an ingot material. The metal sintered compact of each of the inner joint member 93 and the cage 95 has the high relative density of 80% or more and less than 100%, and hardened layers (not shown) are formed on surfaces thereof through heat treatment. Thus, the constant velocity universal joint 91 having requisite functions can be mass-produced with high processability, and even a complicated shape thereof can be formed without waste of materials. In this way, cost reduction of the constant-velocity universal joint 91 can be achieved, resulting in cost reduction of the propeller shaft 105. A composition, properties, and a manufacturing flow of each of the metal sintered compacts are the same as those described above in the first embodiment, and hence description thereof is omitted.

Next, description is made of a constant velocity universal joint according to a seventh embodiment of the present invention with reference to FIGS. 14 to 17. Internal shapes of components of the constant velocity universal joint 1 according to this embodiment, in other words, the track grooves 7 and the spherical inner peripheral surface 6 of the outer joint member 2, the track grooves 9 and the spherical outer peripheral surface 8 of the inner joint member 3, the spherical outer peripheral surface 21 and the spherical inner peripheral surface 22 of the cage 5, and the balls 4 are the same as those in the first embodiment. Thus, the parts having the same functions as those in the first embodiment are denoted by the same reference symbols, and redundant description thereof is omitted. The same applies to an eighth embodiment of the present invention described below.

Figure 14:
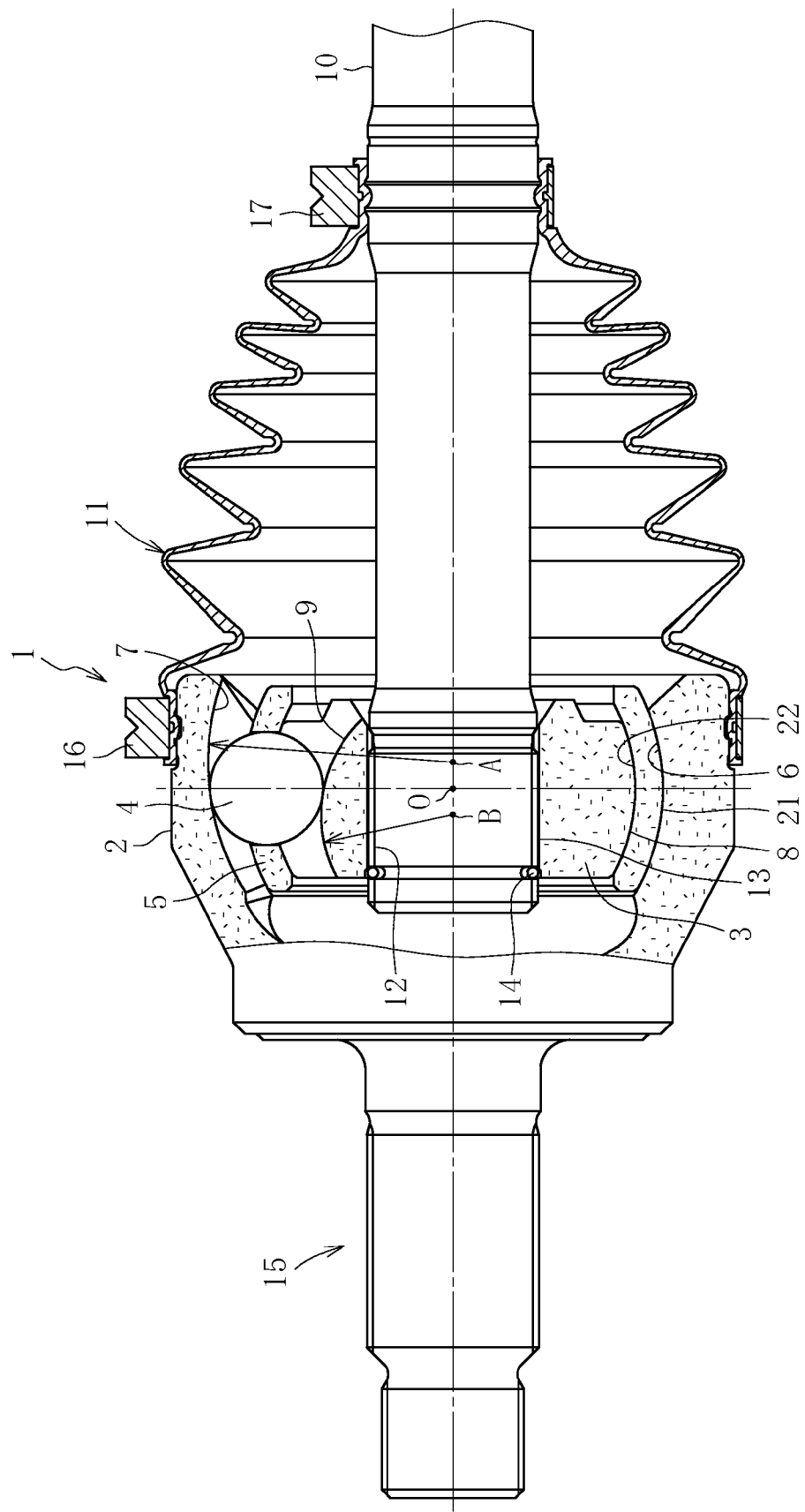
FIG. 14 is a partial vertical sectional view of a constant velocity universal joint according to a seventh embodiment of the present invention.

As illustrated in FIG. 14, also in this embodiment, as in the first embodiment, the outer joint member 2, the inner joint member 3, and the cage 5 of the constant velocity universal joint 1 are each formed of a metal sintered compact. This embodiment is different from the first embodiment in that the ring-shaped cage formed of the metal sintered compact is subjected to a cold rolling process (not shown).

A manufacturing flow of each of the metal sintered compacts 2" and 3" of the outer joint member 2 and the inner joint member 3 of this embodiment comprises the same steps as those described above with reference to FIG. 6 in the first embodiment, that is, the raw-material powder preparation step S1, the powder forming step S2, the degreasing step S3, the sintering step S4, the plastic working step S5, the heat treatment step S6, and the finishing step S7. Further, the metal sintered compacts each formed to have the high relative density of 80% or more and less than 100% can be obtained by the same specific means as that described above in the first embodiment. That is, a green compact is formed through pressurization on granules formed through granulation of raw-material powder, and then the green compact is bonded through sintering and heating. Thus, redundant description thereof is omitted.

Figure 15:
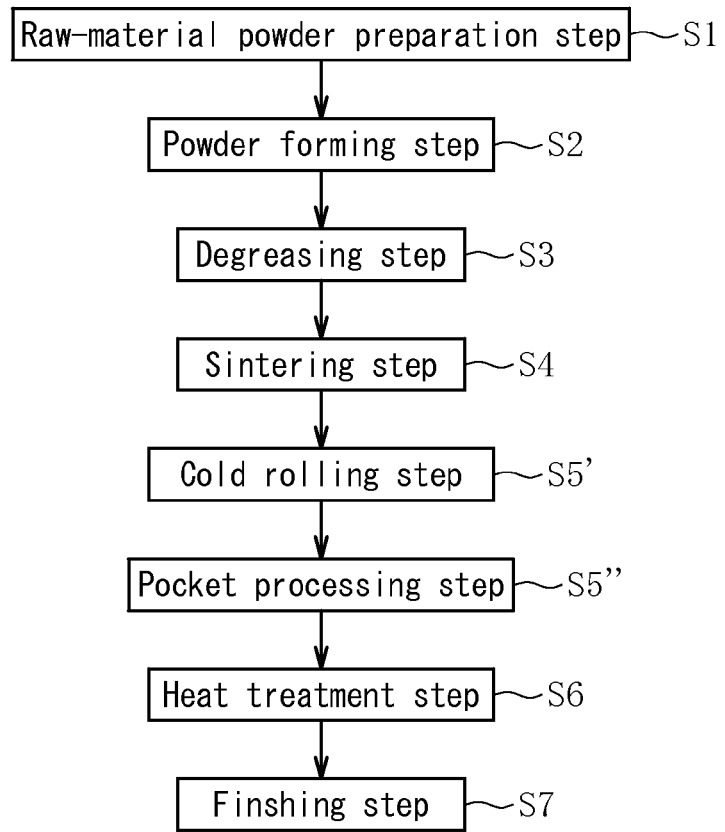
FIG. 15 is a chart illustrating another manufacturing flow of a metal sintered compact.

Description is made of a manufacturing flow of the cage 5 with reference to FIG. 15. In summary, this manufacturing flow of the cage 5 is different in that a cold rolling step S5' and a pocket processing step S5" are performed instead of the above-mentioned plastic working step S5 of FIG. 6.

Figure 16A:
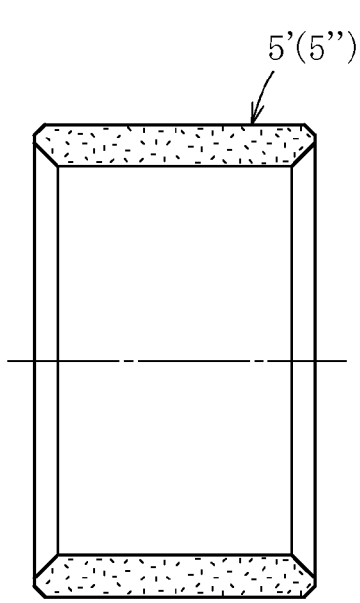
FIG. 16a is a vertical sectional view of a sintered compact of a cage of the constant velocity universal joint according to the seventh embodiment.
Figure 16B:
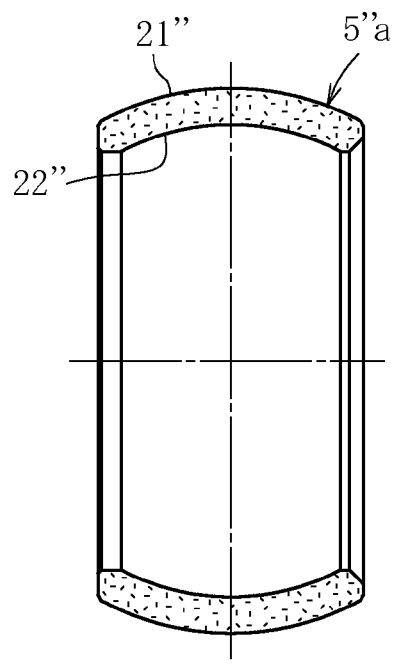
FIG. 16b is a vertical sectional view of a shape of the cage of the constant velocity universal joint according to the seventh embodiment, which is obtained through a cold rolling process.

As illustrated in FIG. 15, the raw-material powder preparation step S1, the powder forming step S2, the degreasing step S3, and the sintering step S4 themselves are the same as those illustrated in FIG. 6 except the following points. With regard to the cage 5, in the powder forming step S2, the green compact 5' is formed into a cylindrical ring shape that does not have the pockets 20 (refer to FIGS. 5a and 5b) as illustrated in FIG. 16a, and then formed into the metal sintered compact 5" through the sintering step S4. After that, by the cold rolling step S5', a metal sintered compact 5"a provided with a spherical outer peripheral surface 21" and a spherical inner peripheral surface 22" as illustrated in FIG. 16b is obtained. Then, the pockets 20 (refer to FIGS. 5a and 5b) are formed by the pocket processing step S5".

As described below, the cold rolling process is a processing method involving thinning of a preform and increasing of a diameter thereof. Thus, the metal sintered compact 5" to be used in the case of forming the spherical outer peripheral surface and the spherical inner peripheral surface through the cold rolling process is formed to be larger in thickness and smaller in diameter than the metal sintered compact 5"a obtained through the rolling process as illustrated in FIGS. 16a and 16b.

Figure 17:
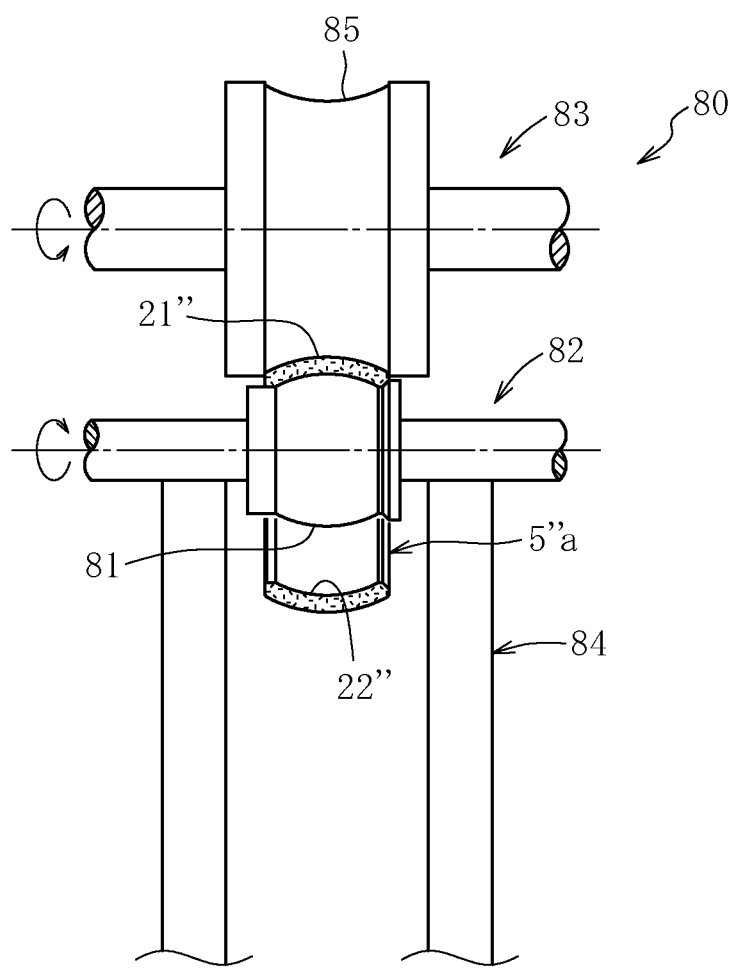
FIG. 17 is a view schematically illustrating the cold rolling process to be performed on the cage.

A processing machine 80 illustrated in FIG. 17 comprises a mandrel 82 that has an outer periphery provided with a die portion 81 for forming the spherical inner peripheral surface 22" and is rotated by receiving an output from a drive source (not shown), a die roller 83 that has an outer periphery provided with a die portion 85 for forming the spherical outer peripheral surface 21" and is rotated (in a direction reverse to that of the mandrel 82) by receiving an output from a drive source (not shown) in a state of being held in contact with an outer surface of the metal sintered compact 5", and support rollers 84 for supporting axial end portions of the mandrel 82. In this processing machine 80, when the metal sintered compact 5" is sandwiched in a radial direction between the mandrel 82 and the die roller 83 that are rotated in directions reverse to each other while the mandrel 82 inserted through an inner periphery of the metal sintered compact 5" is supported with the support rollers 84, an inner surface and an outer surface of the metal sintered compact 5" are plastically deformed respectively in conformity with an outer surface (die portion 85) of the die roller 83 and an outer surface (die portion 81) of the mandrel 82 while being gradually thinned and increased in diameter. In this way, the metal sintered compact 5"a subjected to the cold rolling process is thinned and increased in diameter, and the inner surface and the outer surface thereof are formed into predetermined shapes.

As described above, in the cold rolling process, the spherical outer peripheral surface 21" and the spherical inner peripheral surface 22" are formed on the metal sintered compact 5". Simultaneously, porous structures of the inner and outer surfaces of the metal sintered compact 5"a obtained through the cold rolling process (surface layer portions on an inner side and an outer side) are densified in comparison with a central portion in a thickness direction of the metal sintered compact 5". Thus, strengths of the spherical outer peripheral surface 21" and the spherical inner peripheral surface 22" are enhanced.

Description is made of a situation in which the porous structures are densified through the cold rolling process. The cold rolling process was performed on the metal sintered compact 5" formed into a cylindrical ring shape having the smooth inner surface and the smooth outer surface as illustrated in FIG. 16a and having a density of 7.4 g/cm$^3$ so as to form the metal sintered compact 5" into the metal sintered compact 5"a having the spherical outer peripheral surface 21" and the spherical inner peripheral surface 22" illustrated in FIG. 16b. As a result, the number of pores of the metal sintered compact 5"a obtained through the cold rolling process was smaller as a whole than that of the metal sintered compact 5" before the process. In particular, pores in a region of each of the surface layer portions of the spherical outer peripheral surface 21" and the spherical inner peripheral surface 22" of the metal sintered compact 5"a obtained through the process were substantially eliminated. As a result of measurements, a density in the region of each of the surface layer portions of the spherical outer peripheral surface 21" and the spherical inner peripheral surface 22" of the metal sintered compact 5"a was 7.8 g/cm$^3$ that was substantially equal to that of the ingot material, and a density (average density) of the metal sintered compact 5"a as a whole was 7.6 g/cm$^3$.

After the cold rolling process described above, the metal sintered compact 5"a is provided with the pockets 20 (refer to FIGS. 5a and 5b) in the pocket processing step S5" of FIG. 15. The pocket processing can be performed through a general pressing process and a general machining process.

After the pocket processing step S5", the heat treatment step S6 and the finishing step S7 are performed. In the finishing step S7, the pockets are finished by a grinding process and a trimming process. Other details are the same as those of the heat treatment step S6 and the finishing step S7 of FIG. 6 in the above description, and hence redundant description thereof is omitted.

As described above, the outer joint member 2, the inner joint member 3, and the cage 5 that are components of the constant velocity universal joint 1 according to the seventh embodiment of the present invention are formed of the metal sintered compacts 2", 3", and 5"a each having the high relative density of 80% or more and less than 100%. Thus, a requisite mechanical strength and a requisite durability life can be secured. Further, heat treatment such as quenching treatment is performed on the metal sintered compacts 2", 3", and 5"a so as to form hardened layers on the surfaces thereof. With this, the metal sintered compacts 2", 3", and 5"a can each be provided with an even higher surface hardness. As a result, a Rockwell C-scale hardness (HRC) of 55 or more, preferably 57 or more, which is requisite to each of the track grooves 7 and 9, and the spherical surfaces 6, 8, 21", and 22" of the metal sintered compacts 2", 3", and 5"a, can be secured.

In addition, as described above with reference to FIG. 6, the porous structures are densified through the plastic working on the metal sintered compacts 2" and 3", and hence higher mechanical strengths and longer durability lives of the track grooves 7 and 9, and the spherical surfaces 6 and 8 are achieved. In addition, the cold rolling process (plastic working) is performed on the metal sintered compact 5", and hence the porous structures of the spherical outer peripheral surface 21" and the spherical inner peripheral surface 22" (surface layer portions on an inner side and an outer side) of the metal sintered compact 5"a are densified in comparison with the central portion in the thickness direction of the metal sintered compact 5"a. Thus, the strengths of the spherical outer peripheral surface 21" and the spherical inner peripheral surface 22" are enhanced. Thus, the outer joint member 2, the inner joint member 3, and the cage 5 that are components of the constant velocity universal joint 1 having requisite functions can be mass-produced with high processability, and even complicated shapes thereof can be formed without waste of materials. In this way, cost reduction of the constant velocity universal joint 1 can be achieved. The metal sintered compact of the cage 5 can be manufactured not by a CIP method or an HIP method but by general powder metallurgical pressing, and hence is suited to a series production. In addition, the metal sintered compact is formed through the cold rolling process, and hence material yields are increased. As a result, dimensional accuracy close to that of a finished product can be obtained. Further, despite the high density, the metal sintered compacts 2", 3", and 5"a each have an appropriate number of pores, and hence it is possible to achieve a contact state in which stick-slip is less liable to occur between surfaces of the track grooves 7 and 9 and the balls 4, and the spherical surfaces 6, 8, 21, and 22 in the fixed type constant velocity universal joint. In addition, due to a high holding capability of the grease as a lubricant, generation of the stick-slip and noise at low temperature can be suppressed.

The metal sintered compact of the cage of this embodiment, which is subjected to the cold rolling process, can also be formed to have the high relative density of 80% or more and less than 100% by the same specific means as that described above in the first embodiment. That is, a green compact is formed through pressurization on granules formed through granulation of raw-material powder, and then the green compact is bonded through sintering and heating. The same applies to eighth and ninth embodiments of the present invention described below.

Figure 18B:
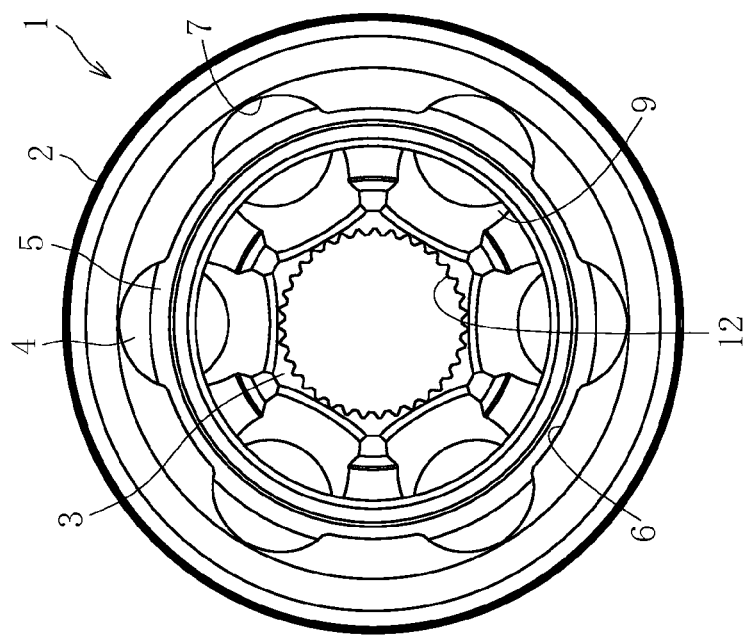
FIG. 18b is a front view of the constant velocity universal joint according to the eighth embodiment.
Figure 18A:
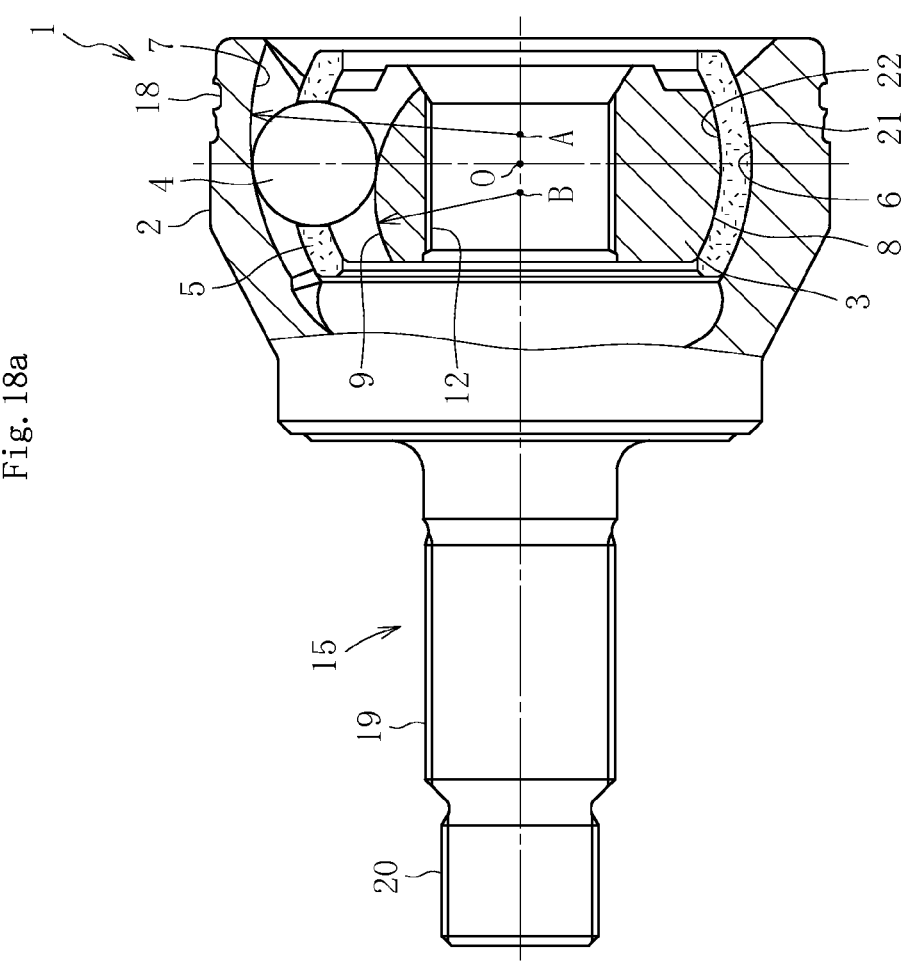
FIG. 18a is a partial vertical sectional view of a constant velocity universal joint according to an eighth embodiment of the present invention.

Next, description is made of the eighth embodiment with reference to FIGS. 18a and 18b. FIG. 18a is a partial vertical sectional view of a constant velocity universal joint according to this embodiment, and FIG. 18b is a front view thereof. The parts having the same functions as those in the first embodiment described above are denoted by the same reference symbols, and redundant description thereof is omitted.

In the constant velocity universal joint 1 according to the eighth embodiment, only the cage 5 is formed of a metal sintered compact, and the outer joint member 2, the inner joint member 3, and the balls 4 are each formed of a generally used ingot material. Internal shapes of components of the constant velocity universal joint 1 according to this embodiment, in other words, the track grooves 7 and the spherical inner peripheral surface 6 of the outer joint member 2, the track grooves 9 and the spherical outer peripheral surface 8 of the inner joint member 3, the spherical outer peripheral surface 21 and the spherical inner peripheral surface 22 of the cage 5, and the balls 4 are the same as those in the first embodiment, and hence redundant description thereof is omitted. The metal sintered compact of the cage 5 also has the high relative density of 80% or more and less than 100%, and a hardened layer 5H is formed on a surface thereof through heat treatment. Further, the cold rolling process is performed on the metal sintered compact. Thus, a requisite mechanical strength and a requisite durability life can be secured. A composition and properties of the metal sintered compact of the cage are the same as those described above in the first embodiment. The cold rolling process and the pocket processing in the manufacturing flow are the same as those described above in the seventh embodiment. Thus, description thereof is omitted.

Figure 19A:
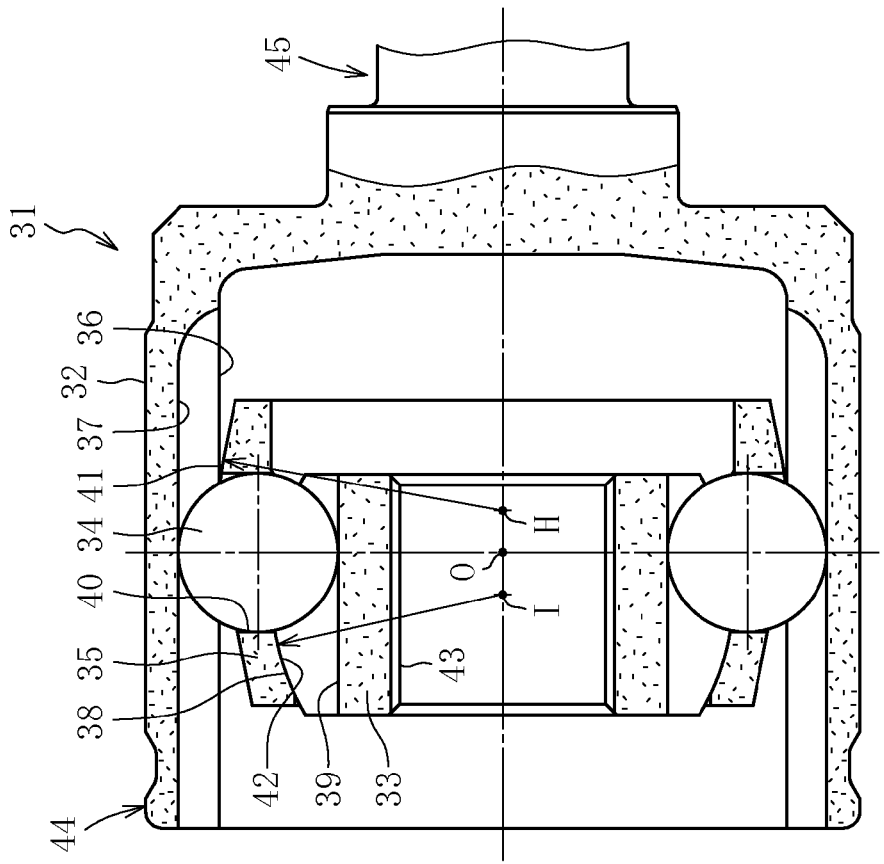
FIG. 19a is a partial vertical sectional view of a constant velocity universal joint according to a ninth embodiment of the present invention.
Figure 19B:
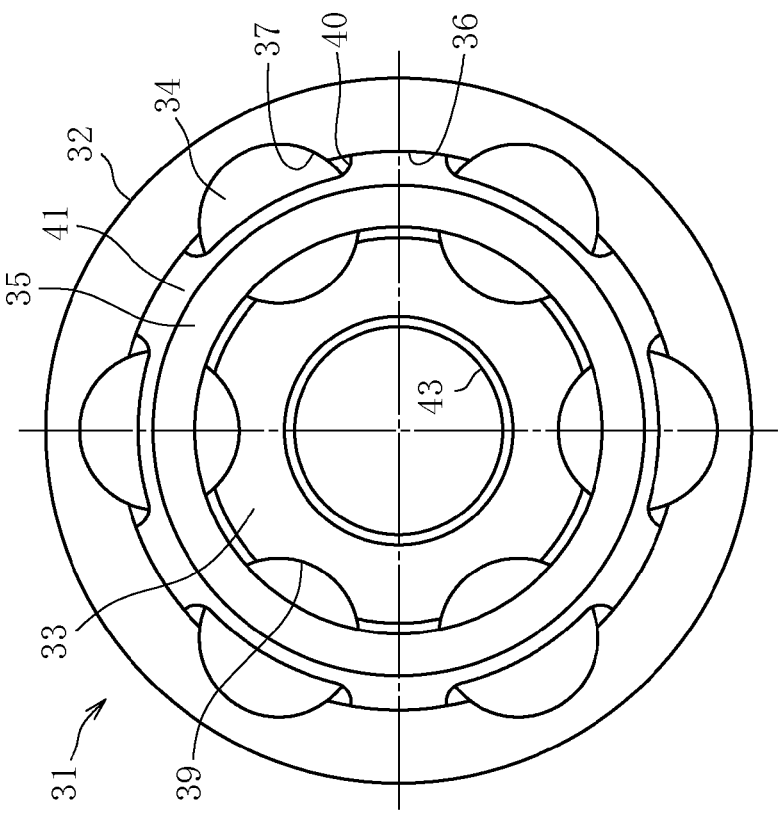
FIG. 19b is a front view of the constant velocity universal joint according to the ninth embodiment.
Figure 20:
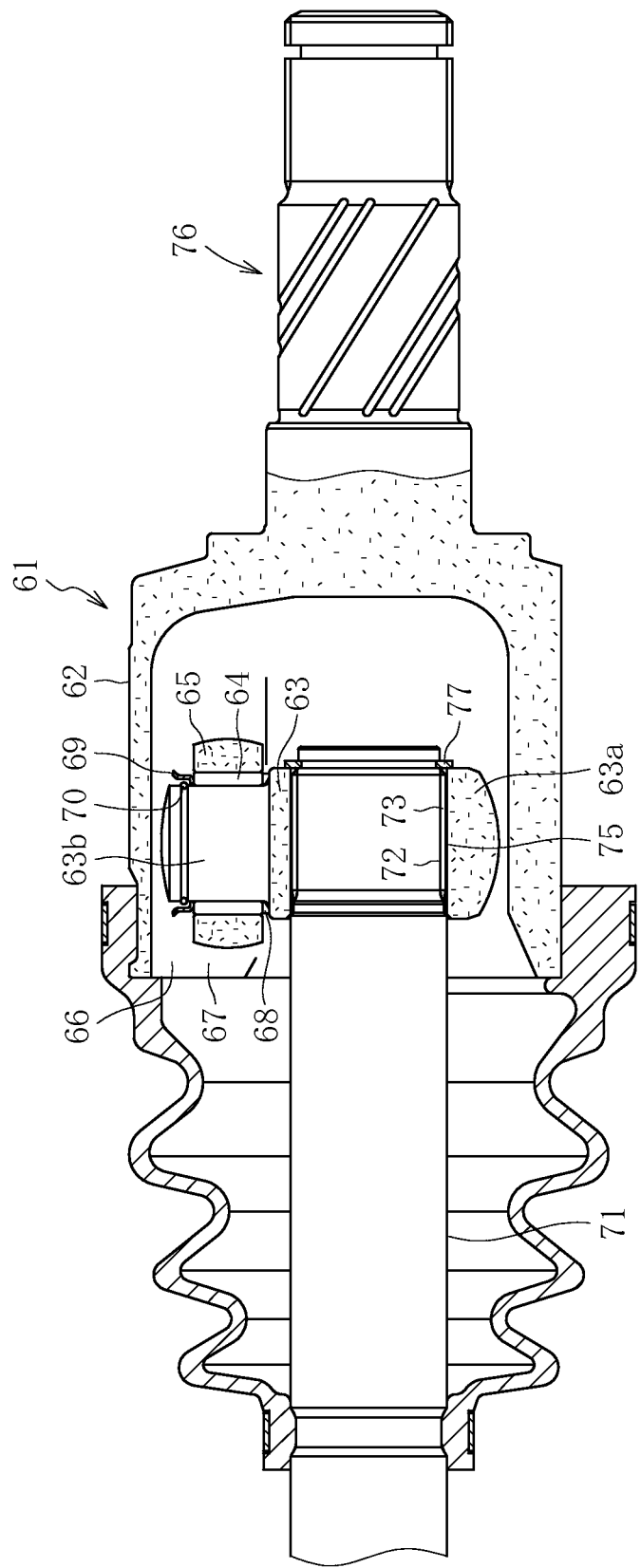
FIG. 20 is a partial vertical sectional view of a constant velocity universal joint according to a tenth embodiment of the present invention.

Description is made of the ninth embodiment with reference to FIGS. 19a and 19b. In an example illustrated in this embodiment, a double offset type constant-velocity universal joint (DOJ) that is a plunging type constant velocity universal joint of one type is applied to an automotive drive shaft as in the embodiments described above. FIG. 19a is a partial vertical sectional view of the constant-velocity universal joint 31 of this embodiment, and FIG. 19b is a front view thereof. Internal shapes of components of the constant velocity universal joint 31 according to this embodiment, in other words, the track grooves 37 and the cylindrical inner peripheral surface 36 of the outer joint member 32, the track grooves 39 and the spherical outer peripheral surface 38 of the inner joint member 33, the spherical outer peripheral surface 41 and the spherical inner peripheral surface 42 of the cage 35, and the balls 34 are the same as those in the fourth embodiment. Thus, the parts having the same functions as those in the fourth embodiment are denoted by the same reference symbols, and redundant description thereof is omitted.

In the plunging type constant velocity universal joint 31 according to this embodiment, the outer joint member 32, the inner joint member 33, and the cage 35 are each formed of the metal sintered compact having the high relative density of 80% or more and less than 100%, and hardened layers (not shown) are formed on the surfaces thereof through heat treatment. Further, the cold rolling process is performed on the cage 35 having a ring shape. Thus, it is possible to secure requisite mechanical strengths and requisite durability lives of the track grooves 37 and 39, the cylindrical inner peripheral surface 36 of the outer joint member 32, the spherical outer peripheral surface 38 of the inner joint member 33, and the spherical outer peripheral surface 41 and the spherical inner peripheral surface 42 of the cage 35. The metal sintered compact of the cage 35 of this embodiment, which has the spherical outer peripheral surface 41 and the spherical inner peripheral surface 42 offset to each other, is also formed into a cylindrical ring shape that does not have the pockets 40 prior to the cold rolling process, and then formed to have the spherical outer peripheral surface 41 and the spherical inner peripheral surface 42 through the cold rolling process. An outer surface (die portion) of a die roller and an outer surface (die portion) of a mandrel of a rolling processing machine are each formed in conformity with the shape of the cage 35 described above. A composition, properties, and a manufacturing flow of each of the metal sintered compacts are the same as those described above in the first embodiment. The cold rolling process and the pocket processing on the cage in the manufacturing flow are the same as those described above in the seventh embodiment. Thus, detailed description thereof is omitted.

Description is made of a tenth embodiment of the present invention with reference to FIGS. 21 and 26. Internal shapes of components of the constant-velocity universal joint 61 according to this embodiment, in other words, the outer joint member 62, the tripod member 63 as an inner joint member, the rolling elements 64, and the spherical rollers 65 are the same as those in the fifth embodiment. Thus, the parts having the same functions as those in the fifth embodiment are denoted by the same reference symbols, and redundant description thereof is omitted.

In this embodiment, the outer joint member 62, the tripod member 63 as an inner joint member, and the spherical rollers 65 that are components of the tripod type constant-velocity universal joint 61 are each formed of the metal sintered compact having the high relative density of 80% or more and less than 100%, and hardened layers (e.g., the hardened layer 65H of each of the spherical rollers 65) are formed on the surfaces thereof through heat treatment. In addition, the cold rolling process is performed on the ring-shaped roller 65 illustrated in FIG. 21. Although not shown, in this case, the metal sintered compact to be used for the roller 65 having a spherical outer peripheral surface and a cylindrical inner peripheral surface prior to the cold rolling process is formed to be larger in thickness and smaller in diameter than the metal sintered compact obtained through the rolling process. Then, the metal sintered compact is finished to be smaller in thickness and larger in diameter through the cold rolling process as schematically illustrated in FIG. 26. An outer surface (die portion) of a die roller and an outer surface (die portion) of a mandrel of a rolling processing machine are formed in conformity with the shapes of the spherical outer peripheral surface and the cylindrical inner peripheral surface of the roller 65 described above. Thus, it is possible to secure requisite mechanical strengths and requisite durability lives of the track grooves 66 (roller guide surfaces 67) of the outer joint member 62, the spherical rollers 65, and the leg shafts 63b of the tripod member 63. A composition, properties, and a manufacturing flow of each of the metal sintered compacts are the same as those described above in the first embodiment. The cold rolling process on the spherical roller in the manufacturing flow is the same as that described above in the seventh embodiment. Thus, detailed description thereof is omitted. Further, the metal sintered compact of the spherical roller of this embodiment, which is subjected to the cold rolling process, can also be formed to have the high relative density of 80% or more and less than 100% by the same specific means as that described above in the first embodiment. That is, a green compact is formed through pressurization on granules formed through granulation of raw-material powder, and then the green compact is bonded through sintering and heating.

Figure 22:
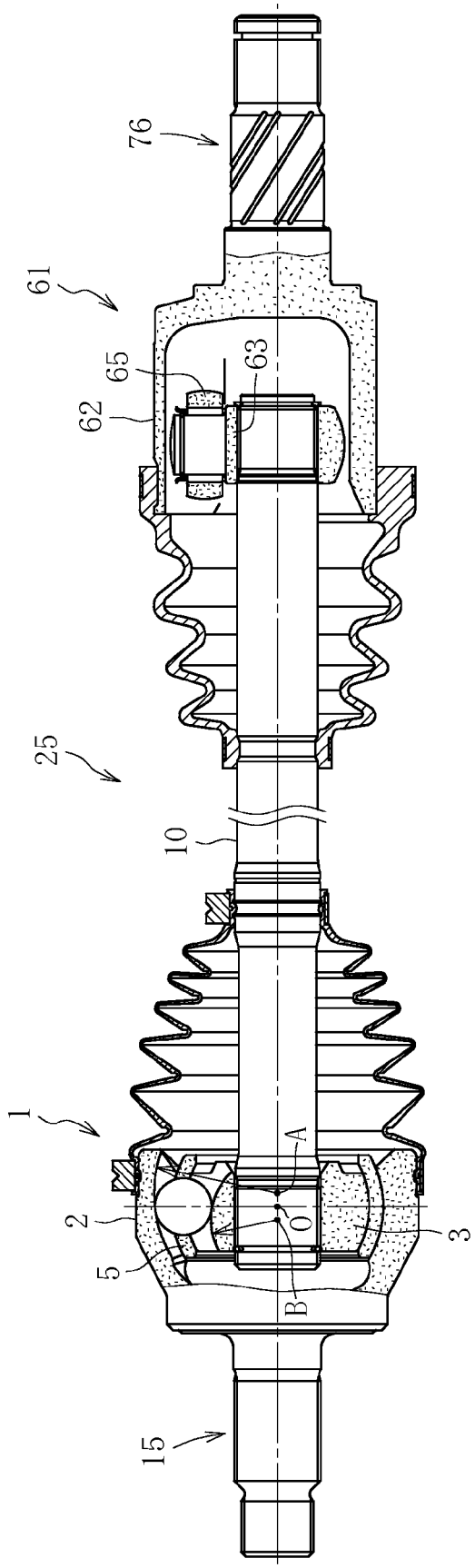
FIG. 22 is a partial vertical sectional view of a drive shaft obtained by coupling thereto the constant velocity universal joints according to the present invention.
Figure 23A:
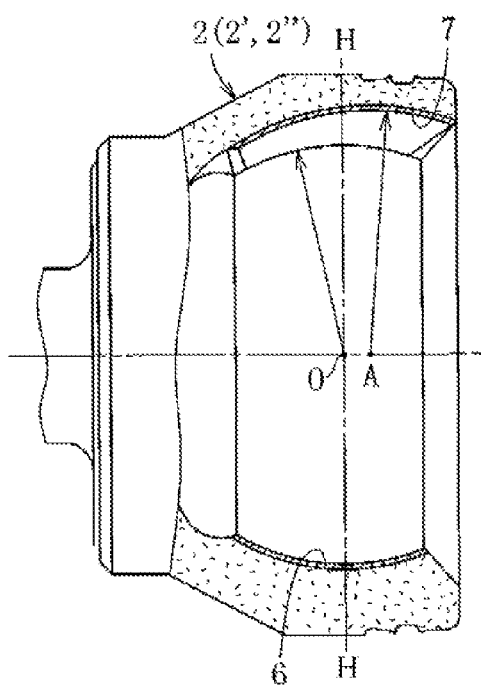
FIG. 23a is a partial vertical sectional schematic view of the outer joint member of the constant velocity universal joint after plastic working according to the first embodiment.
Figure 23B:
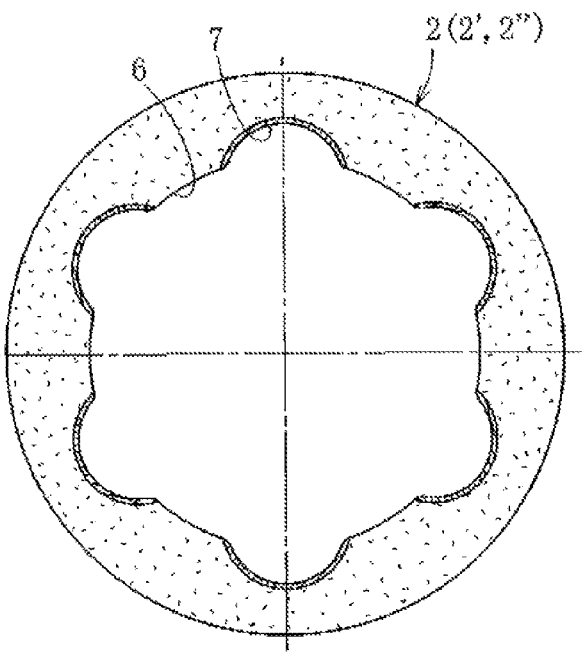
Figure 24A:
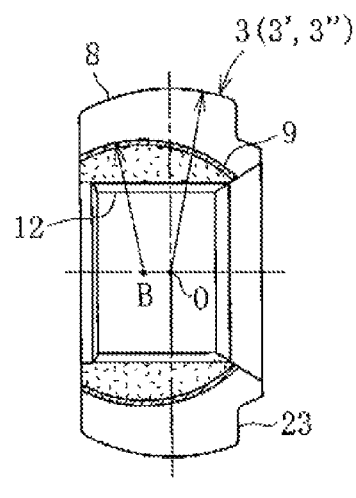
FIG. 24a is a vertical sectional view taken along the line I-I in FIG. 24b, for schematically illustrating the inner joint member of the constant velocity universal joint after plastic working according to the first embodiment.
Figure 24B:
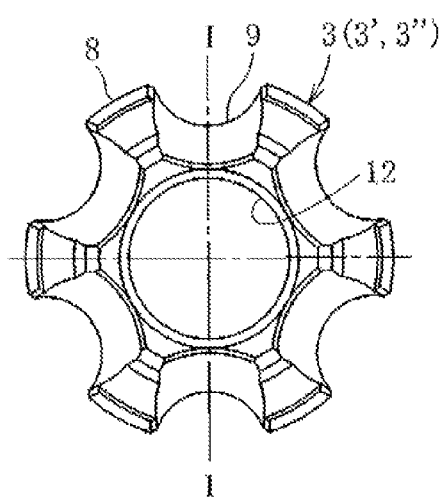
FIG. 24b is a front view of the inner joint member after plastic working according to the first embodiment.
Figure 25A:
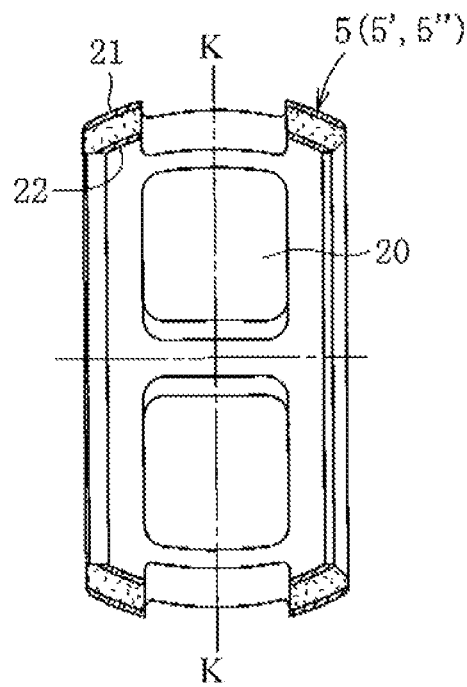
FIG. 25a is a vertical sectional view taken along the line L-L of FIG. 25b, for schematically illustrating the cage of the constant velocity universal joint after plastic working according to the first embodiment.
Figure 25B:
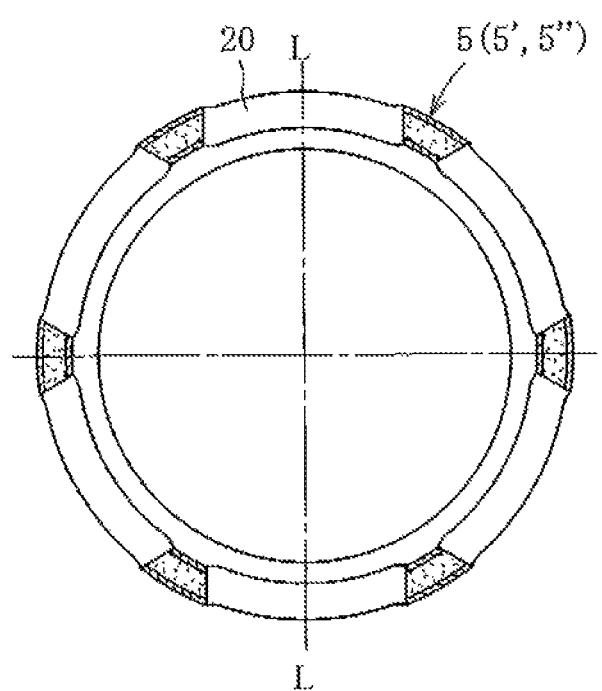

FIG. 22 illustrates an automotive drive shaft 25 obtained by coupling the fixed type constant velocity universal joint 1 according to the first embodiment and the plunging type constant velocity universal joint 61 according to the fifth embodiment of the present invention respectively to both ends of the intermediate shaft 10. Although not shown, the fixed type constant velocity universal joint 1 is coupled to a wheel bearing device, and the plunging type constant velocity universal joint 61 is coupled to a side gear of a differential. The outer joint members 2 and 62, the inner joint members 3 and 63, the cage 5, and the spherical rollers 65 that are the components of the constant velocity universal joints 1 and 61 are each formed of the metal sintered compact having the high relative density of 80% or more and less than 100%, and hardened layers are formed on the surfaces thereof through heat treatment. Thus, the constant velocity universal joints 1 and 61 each having requisite functions can be mass-produced with high processability, and even the complicated shapes thereof can be formed without waste of materials. Further, the fixed type constant velocity universal joint 1 according to the seventh embodiment and the plunging type constant velocity universal joint 61 according to the tenth embodiment of the present invention, in which the cold rolling process is performed on the metal sintered compacts to be formed into the ring-shaped cage 5 and the ring-shaped rollers 65, are also applicable to the automotive drive shaft 25. In this way, cost reduction of the constant velocity universal joints 1 and 61 can be achieved, resulting in cost reduction of the drive shaft 25.

In the embodiments described above, the Rzeppa type constant velocity universal joint is taken as an example of the fixed type constant velocity universal joint, and the double offset type constant velocity universal joint and the tripod type constant velocity universal joint are taken as an example of the plunging type constant velocity universal joint. However, the present invention is not limited thereto. In addition to the examples described above, the fixed type constant velocity universal joint may comprise an undercut free type constant velocity universal joint and a counter track type constant velocity universal joint, and the plunging type constant velocity universal joint may comprise a cross-groove type constant velocity universal joint. Also in this way, the present invention may be appropriately carried out. In the illustrated examples, the constant velocity universal joints of the embodiments of the present invention are applied to the automotive drive shaft. However, the present invention is not limited thereto, and the constant velocity universal joints are applicable also to a propeller shaft and a power transmission shaft for aircraft, ships, and various industrial machines.

Further, the present invention is not limited to the embodiments described above, and as a matter of course, can be carried out in various other embodiments without departing from the gist of the present invention. The scope of the present invention is described in "Claims," and encompasses meaning of equivalents of description of "Claims" and all modifications within the scope of "Claims."

DESCRIPTION OF REFERENCE SIGNS

1: Constant velocity universal joint
2: Outer joint member
3: Inner joint member
4: Torque transmitting member (ball)
5: Cage
7: Track groove
9: Track groove
10: Intermediate shaft
25: Drive shaft
31: Constant velocity universal joint
32: Outer joint member
33: Inner joint member
34: Torque transmitting member (ball)
35: Cage
37: Track groove
39: Track groove
61: Constant velocity universal joint
62: Outer joint member
63: Inner joint member (tripod member)
64: Rolling element
65: Torque transmitting member (spherical roller)
66: Track groove
67: Roller guide surface
91: Constant velocity universal joint
92: Outer joint member
93: Inner joint member
94: Torque transmitting member (ball)
95: Cage
105: Propeller shaft
S1: Raw-material powder preparation step
S2: Powder forming step
S3: Degreasing step
S4: Sintering step
S5: Plastic working step
S5': Cold rolling step
S5": Pocket processing step
S6: Heat treatment step
S7: Finishing step

The invention claimed is:

1. A constant velocity universal joint comprising:
an outer joint member;
an inner joint member arranged inside of the outer joint member; and
torque transmitting members,
wherein at least one of the outer joint member and the inner joint member comprises track grooves that are engaged with rolling surfaces of the torque transmitting members,
wherein at least one component of the constant velocity universal joint is formed of a metal sintered compact having pores,
wherein the metal sintered compact has a relative density of 80% or more and less than 100%,
wherein the metal sintered compact comprises a heat-treated hardened layer formed on a surface thereof, and
wherein the surface includes a first surface portion having porous structures densified through partial plastic working, and a second surface portion free from plastic working, the second surface portion retaining a lubricant.

2. A constant velocity universal joint according to claim 1, wherein the outer joint member comprises the track grooves,
wherein the inner joint member comprises the track grooves, and
wherein the torque transmitting members comprise balls that are engaged between the track grooves of the outer joint member and the inner joint member, the balls being held by a cage.

3. A constant velocity universal joint according to claim 2, wherein the metal sintered compact is made of alloyed powder containing:
a metal powder of an iron-based alloy as a main component; and
at least chromium of from 0.5 mass % to 20 mass % and molybdenum of 3 mass % or less.

4. A constant velocity universal joint according to claim 2, wherein the metal sintered compact includes sintered granules of a raw-material powder containing a metal powder of an iron-based alloy as a main component.

5. A constant velocity universal joint according to claim 1, wherein the inner joint member comprises a tripod member, wherein the tripod member comprises rollers mounted thereto in a freely rotatable manner, and wherein the rollers are engaged with the track grooves, the outer joint member comprising the track grooves.

6. A constant velocity universal joint according to claim 5, wherein the metal sintered compact is made of alloyed powder containing:
   a metal powder of an iron-based alloy as a main component; and
   at least chromium of from 0.5 mass % to 20 mass % and molybdenum of 3 mass % or less.

7. A constant velocity universal joint according to claim 5, wherein the metal sintered compact includes sintered granules of a raw-material powder containing a metal powder of an iron-based alloy as a main component.

8. A constant velocity universal joint according to claim 1, wherein the metal sintered compact is made of alloyed powder containing:
   a metal powder of an iron-based alloy as a main component; and
   at least chromium of from 0.5 mass % to 20 mass % and molybdenum of 3 mass % or less.

9. A constant velocity universal joint according to claim 8, wherein the metal sintered compact includes sintered granules of a raw-material powder containing a metal powder of an iron-based alloy as a main component.

10. A constant velocity universal joint according to claim 1, wherein the metal sintered compact includes sintered granules of a raw-material powder containing a metal powder of an iron-based alloy as a main component.

11. A constant velocity universal joint according to claim 1, wherein the first surface portion is formed at at least one of raceway surfaces and the track grooves.

12. A constant velocity universal joint according to claim 1, wherein the metal sintered compact includes a green compact of a raw-material powder that is mixed with a solid lubricant and sintered.

13. A constant velocity universal joint according to claim 12, wherein the green compact is sintered in an inert gas atmosphere or under vacuum.

14. A constant velocity universal joint according to claim 1, wherein the metal sintered compact includes a green compact formed by pressurizing a raw-material powder with a pressing force of 800 MPa or more and 1,100 MPa or less that is sintered at 1,150° C. or more and 1,300° C. or less.

15. A constant velocity universal joint according to claim 1, further comprising a ring-shaped component, the ring-shaped component being one of the at least one component formed of the metal sintered compact.

16. A constant velocity universal joint according to claim 15, wherein the torque transmitting members comprise balls, and the ring-shaped component comprises a cage for holding the balls.

17. A constant velocity universal joint according to claim 15, wherein the ring-shaped component comprises rollers of a tripod type constant-velocity universal joint.

18. A constant velocity universal joint according to claim 1, further comprising a ring-shaped component that is formed of another metal sintered compact,
   wherein the other metal sintered compact comprises a heat-treated hardened layer formed on a surface thereof, and
   wherein the surface of the ring-shaped component is cold rolled and densified to a higher degree than other regions of the ring-shaped component.

19. A drive shaft, comprising the constant velocity universal joint according to claim 1, which is coupled to at least one end thereof.

20. A propeller shaft, comprising the constant velocity universal joint according to claim 1, which is coupled to at least one end thereof.

* * * * *